(12) United States Patent
Wiese et al.

(10) Patent No.: US 7,996,511 B1
(45) Date of Patent: Aug. 9, 2011

(54) ENTERPRISE-SCALABLE SCANNING USING GRID-BASED ARCHITECTURE WITH REMOTE AGENTS

(75) Inventors: James Christopher Wiese, Dublin, CA (US); Stephen C. Hoyt, Palo Alto, CA (US); James Donald Nisbet, Menlo Park, CA (US)

(73) Assignee: EMC Corporation, Hopkinton, MA (US)

( * ) Notice: Subject to any disclaimer, the term of this patent is extended or adjusted under 35 U.S.C. 154(b) by 379 days.

(21) Appl. No.: 12/106,228

(22) Filed: Apr. 18, 2008

Related U.S. Application Data

(63) Continuation-in-part of application No. 11/608,240, filed on Dec. 7, 2006, and a continuation-in-part of application No. 10/949,539, filed on Sep. 24, 2004, now Pat. No. 7,516,492, and a continuation-in-part of application No. 10/949,545, filed on Sep. 24, 2004, now Pat. No. 7,523,301, and a continuation-in-part of application No. 10/949,552, filed on Sep. 24, 2004.

(60) Provisional application No. 60/912,429, filed on Apr. 18, 2007, provisional application No. 60/748,531, filed on Dec. 8, 2005, provisional application No. 60/515,036, filed on Oct. 28, 2003.

(51) Int. Cl.
*G06F 15/173* (2006.01)

(52) U.S. Cl. ............... 709/223; 726/4; 726/12; 713/188

(58) Field of Classification Search .................. 709/223
See application file for complete search history.

(56) References Cited

U.S. PATENT DOCUMENTS

| | | | |
|---|---|---|---|
| 6,360,279 B1 * | 3/2002 | Woods et al. ................. 719/318 |
| 7,031,999 B1 * | 4/2006 | Ludwig et al. ................ 709/202 |
| 7,293,177 B2 * | 11/2007 | Lahti et al. .................... 713/188 |
| 2002/0004815 A1 | 1/2002 | Muhlestein et al. |
| 2002/0100036 A1 * | 7/2002 | Moshir et al. ................. 717/173 |
| 2003/0023728 A1 * | 1/2003 | Yaung ............................ 709/226 |
| 2003/0084134 A1 * | 5/2003 | Pace et al. ..................... 709/223 |
| 2003/0221124 A1 * | 11/2003 | Curran et al. ................. 713/201 |

(Continued)

OTHER PUBLICATIONS

Jim Wiese, "Push and run .NET Code on Remote Machine" (main article), Posted Dec. 11, 2004 at http://www.codeproject.com/KB/IP/run_code_remotely.aspx, 10 pgs.

(Continued)

*Primary Examiner* — Kambiz Zand
*Assistant Examiner* — Yonas Bayou
(74) *Attorney, Agent, or Firm* — PatentVentures; Bennett Smith; Korbin Van Dyke

(57) ABSTRACT

An enterprise coordinator coupled to one or more site coordinators provides configuration and scheduling of tasks across a plurality of sites, and accumulates results. Each of the site coordinators optionally manages one or more respective agents to perform agent-local ones of the tasks, and optionally manages one or more respective grid workers to perform, in a distributed fashion, site-local ones of the tasks. Each of the site coordinators optionally apportions a state file into respective work lists that are assigned to the respective grid workers, and concatenates at least some portions of received results to produce a new state file. Each of the grid workers performs operations in accordance with the assigned work list and returns results including an updated version of the work list. In some usage scenarios, a bootstrapping technique is used to install an agent program on unprovisioned ones of the agents and/or the grid workers.

20 Claims, 13 Drawing Sheets

U.S. PATENT DOCUMENTS

| | | | | |
|---|---|---|---|---|
| 2004/0205598 | A1* | 10/2004 | Takahashi et al. | 715/513 |
| 2004/0255161 | A1* | 12/2004 | Cavanaugh | 713/201 |
| 2005/0005169 | A1* | 1/2005 | Kelekar | 713/201 |
| 2005/0091537 | A1* | 4/2005 | Nisbet et al. | 713/201 |
| 2005/0267915 | A1* | 12/2005 | Zhulong et al. | 707/200 |
| 2007/0203938 | A1* | 8/2007 | Prahlad et al. | 707/102 |
| 2008/0005624 | A1* | 1/2008 | Kakivaya et al. | 714/47 |
| 2009/0193113 | A1* | 7/2009 | Lunde | 709/224 |

OTHER PUBLICATIONS

Reader Commentary to "Push and Run .NET Code on Remote Machine", various entries dating from Dec. 12, 2004 through Mar. 26, 2008, available at http://www.codeproject.com/KB/IP/run_code_remotely.aspx?display=PrintAll&fid=134548&df=90&mpp=25&noise=3&sort=Position&view=Quick&fr=1#xx0xx, 20 pgs.

Michel Barnett, ".Net Remoting Authentication and Authorization Sample—Part I", published Jan. 2004, by Microsoft Developer Network (MSDN), at http://msdn.microsoft.com/en-us/library/ms973911.aspx, 21 pgs.

Michel Barnett, ".Net Remoting Authentication and Authorization Sample—Part II", published Jan. 2004, by Microsoft Developer Network (MSDN), at http://msdn.microsoft.com/en-us/library/ms973909.aspx, 32 pgs.

Mark Russinovich, "Sysinternals Freeware—Utilities for Windows NT and Windows 2000—PsExec", by Mark Russinovich, Archived by web.archive.org on Dec. 12, 2004 at http://web.archive.org/web/20041212024433/http://www.sysinternals.com/ntw2k/freeware/psexec.shtml, 3 pgs.

Mark Russinovich, "PSExec", Published in the Jul. 2004 edition of Windows IT Pro magazine and online at http://windowsitpro.com/article/articleid/42919/psexec.html, Jun. 29, 2004, 3 pgs.

Jim Wiese, Run_Code_remotely_src top-level directory source files for "Push and Run .NET Code on Remote Machine", Posted Dec. 11, 2004 at http://www.codeproject.com/KB/IP/run_code_remotely.aspx, 2 pgs.

Jim Wiese, CodeProject.Remoting.Common top-level directory source files for "Push and Run .NET Code on Remote Machine", Posted Dec. 11, 2004 at http://www.codeproject.com/KB/IP/run_code_remotely.aspx, 46 pgs.

Jim Wiese, ExecRemote top-level directory source files for "Push and Run .NET Code on Remote Machine", Posted Dec. 11, 2004 at http://www.codeproject.com/KB/IP/run_code_remotely.aspx, 51 pgs.

Jim Wiese, QuickDir top-level directory source files for "Push and Run .NET Code on Remote Machine", Posted Dec. 11, 2004 at http://www.codeproject.com/KB/IP/run_code_remotely.aspx, 26 pgs.

Jim Wiese, Server top-level directory source files for "Push and Run .NET Code on Remote Machine", Posted Dec. 11, 2004 at http://www.codeproject.com/KB/IP/run_code_remotely.aspx, 7 pgs.

Jim Wiese, ServiceOnRemoteMachine top-level directory source files for "Push and Run .NET Code on Remote Machine", Posted Dec. 11, 2004 at http://www.codeproject.com/KB/IP/run_code_remotely.aspx, 40 pgs.

Jim Wiese, WinFormTest top-level directory source files for "Push and Run .NET Code on Remote Machine", Posted Dec. 11, 2004 at http://www.codeproject.com/KB/IP/run_code_remotely.aspx, 11 pgs.

Suzanne Cook, "Suzanne Cook's .NET CLR Notes: Common Language Runtime Developer" (in 2 separately numbers parts), various entries dating from May 29, 2003 through Feb. 11, 2005, published by Microsoft Developer Network (MSDN), at http://blogs.msdn.com/suzcook/Default.aspx, 19 pgs.

Table of Sep. 30, 2009 identifying references used to reject claims in related applications; 1 page.

List of Art Rejections in 2010 Office Actions in Related Case U.S. Appl. No. 11/608,240; 1 page.

* cited by examiner

ENTERPRISE-SCALABLE SCANNING USING GRID-BASED ARCHITECTURE WITH REMOTE AGENTS

CROSS REFERENCE TO RELATED APPLICATIONS

Priority benefit claims for this application are made in the accompanying Application Data Sheet, Request, or Transmittal (as appropriate, if any). To the extent permitted by the type of the instant application, this application incorporates by reference for all purposes the following applications, all owned by the owner of the instant application:
- U.S. Non-Provisional application Ser. No. 10/949,539, filed Sep. 24, 2004, first named inventor James Nisbet, and entitled INFERRING DOCUMENT AND CONTENT SENSITIVITY FROM PUBLIC ACCOUNT ACCESSIBILITY;
- U.S. Non-Provisional application Ser. No. 10/949,545, filed Sep. 24, 2004, first named inventor James Nisbet, and entitled INFERRING CONTENT SENSITIVITY FROM PARTIAL CONTENT MATCHING;
- U.S. Non-Provisional application Ser. No. 10/949,552, filed Sep. 24, 2004, first named inventor James Nisbet, and entitled PARTIAL DOCUMENT CONTENT MATCHING USING SECTIONAL ANALYSIS;
- U.S. Non-Provisional application Ser. No. 11/608,240, filed Dec. 7, 2006, first named inventor James Christopher Wiese, and entitled A REPERCUSSIONLESS EPHEMERAL AGENT FOR SCALABLE PARALLEL OPERATION OF DISTRIBUTED COMPUTERS; and
- U.S. Provisional Application Ser. No. 60/912,429, filed Apr. 18, 2007, first named inventor James Christopher Wiese, and entitled ENTERPRISE-SCALABLE SCANNING USING GRID-BASED ARCHITECTURE WITH REMOTE AGENTS.

BACKGROUND

1. Field

Advancements in operating a multiplicity of computers are needed to provide improvements in performance, efficiency, and utility of use.

2. Related Art

Unless expressly identified as being publicly or well known, mention herein of techniques and concepts, including for context, definitions, or comparison purposes, should not be construed as an admission that such techniques and concepts are previously publicly known or otherwise part of the prior art. All references cited herein (if any), including patents, patent applications, and publications, are hereby incorporated by reference in their entireties, whether specifically incorporated or not, for all purposes.

Some computer systems are distributed, having a multiplicity of computers and file systems attached to the computers. In some usage scenarios, the file systems store large data sets. In some usage scenarios, the computers and/or the file systems span multiple sites. Operating the multiplicity of computers is complex, and accessing the large data sets is resource-intensive.

SYNOPSIS

The invention may be implemented in numerous ways, including as a process, an article of manufacture, an apparatus, a system, a composition of matter, and a computer readable medium such as a computer readable storage medium or a computer network wherein program instructions are sent over optical or electronic communication links. In this specification, these implementations, or any other form that the invention may take, may be referred to as techniques. The Detailed Description provides an exposition of one or more embodiments of the invention that enable improvements in performance, efficiency, and utility of use in the field identified above. The Detailed Description includes an Introduction to facilitate the more rapid understanding of the remainder of the Detailed Description. The Introduction includes Example Embodiments of one or more of systems, methods, articles of manufacture, and computer readable media in accordance with the concepts described herein. As is discussed in more detail in the Conclusions, the invention encompasses all possible modifications and variations within the scope of the issued claims.

DETAILED DESCRIPTION

Figure 1:
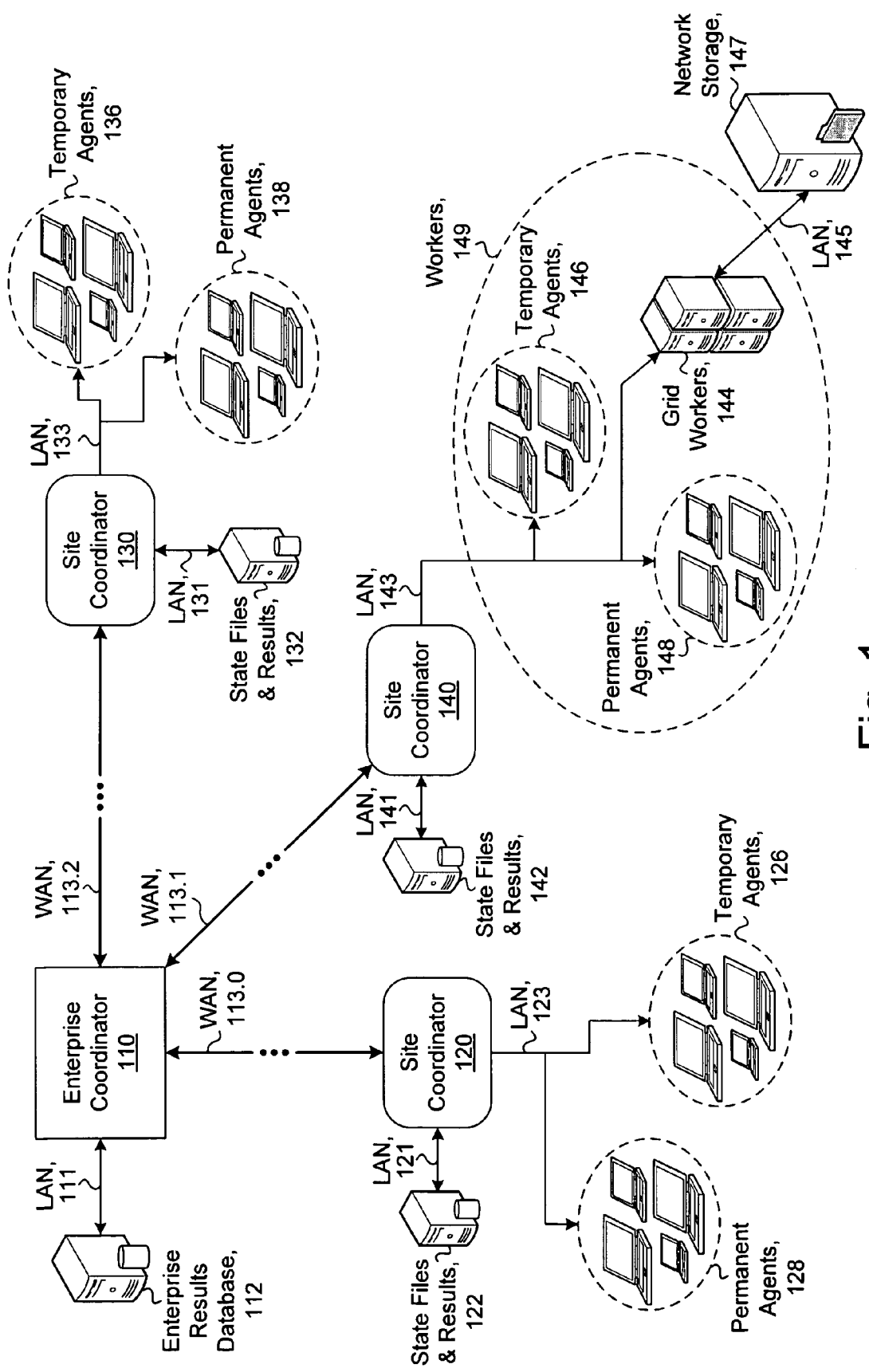
FIG. 1 illustrates selected details of an illustrative embodiment of a system having an enterprise coordinator and a plurality of site coordinators.

A detailed description of one or more embodiments of the invention is provided below along with accompanying figures illustrating selected details of the invention. The invention is described in connection with the embodiments. It is well established that it is neither necessary, practical, or possible to exhaustively describe every embodiment of the invention. Thus the embodiments herein are understood to be merely exemplary, the invention is expressly not limited to or by any or all of the embodiments herein, and the invention encompasses numerous alternatives, modifications and equivalents.

To avoid monotony in the exposition, a variety of word labels (including but not limited to: first, last, certain, various, further, other, particular, select, some, and notable) may be applied to separate sets of embodiments; as used herein such labels are expressly not meant to convey quality, or any form of preference or prejudice, but merely to conveniently distinguish among the separate sets. The order of some operations of disclosed processes is alterable within the scope of the invention. Wherever multiple embodiments serve to describe variations in process, method, and/or program instruction features, other embodiments are contemplated that in accordance with a predetermined or a dynamically determined criterion perform static and/or dynamic selection of one of a plurality of modes of operation corresponding respectively to a plurality of the multiple embodiments. Numerous specific details are set forth in the following description to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Introduction

This introduction is included only to facilitate the more rapid understanding of the Detailed Description; the invention is not limited to the concepts presented in the introduction (including explicit examples, if any), as the paragraphs of any introduction are necessarily an abridged view of the entire subject and are not meant to be an exhaustive or restrictive description. For example, the introduction that follows provides overview information limited by space and organization to only certain embodiments. There are many other embodiments, including those to which claims will ultimately be drawn, discussed throughout the balance of the specification.

Acronyms

Elsewhere herein various shorthand abbreviations, or acronyms, are used to refer to certain elements. The descriptions of at least some of the acronyms follow.

| Acronym | Description |
| --- | --- |
| CRC | Cyclical Redundancy Check |
| EC | Enterprise Coordinator |
| I/O | Input/Output |
| IP | Internet Protocol |
| ISF | Incremental State File |
| LAN | Local Area Network |
| MD5 | Message-Digest algorithm 5 |
| NAS | Network Attached Storage |
| RAID | Redundant Array of Inexpensive Disks |
| SAN | Storage Area Network |
| SC | Site Coordinator |
| SF | State File |
| TCP | Transmission Control Protocol |
| UDP | User Datagram Protocol |
| WAN | Wide Area Network |

Overview

An enterprise includes a plurality of sites, each site including a plurality of site-specific storage volumes. According to various embodiments, some of the site-specific storage volumes are local disks, such as a disk in a laptop or in a workstation, and some of the storage volumes are global storage of the site, such as a storage area network accessible via one or more networks of the site. In some usage scenarios, a total size of storage at a particular site is measured in Terabytes (TB), and a total number of files at the particular site is measured in billions. In such scenarios, performing scanning operations (such as scanning for particular files, scanning for particular file contents, or determining if files have been copied to inappropriate places) is very compute intensive. In some embodiments, operations are performed across an enterprise and information regarding particular files is exchanged between sites.

In some embodiments, an enterprise coordinator manages a plurality of site coordinators, each site coordinator associated with a respective site. Each of the site coordinators manages a plurality of site-specific workers, and uses the site-specific workers to perform tasks on site-specific storage volumes of the respective site. In some embodiments and/or usage scenarios, some of the site-specific storage volumes include some or all of local disks and/or file systems of some of the site-specific workers. In some embodiments and/or usage scenarios, some of the site-specific storage volumes include site-global storage, such as storage area networks (SANs) or network attached storage (NAS) devices. In further embodiments, each of the site coordinators optionally manages one or more respective state files, each respective state file including information regarding a state of files of some or all of one or more of the site-specific storage volumes. In some embodiments, use of the respective state files enables all of the site-specific storage volumes of a site to be processed in a similar manner, whether the site-specific storage volumes are site-global storage or are some form of local storage of the site-specific workers. In further embodiments, use of the respective state files enables each of the storage volumes that are local storage of a particular one of the site-specific workers to be scanned by the particular worker, and enables storage volumes that are site-global to be scanned in a distributed fashion by a plurality of the site-specific workers.

In some embodiments, there are three types of the site-specific workers: temporary agents, permanent agents, and grid workers. In some embodiments, a same computer is, or acts as, one or more of the three types of workers at a same time and/or at different times. In various embodiments, a temporary agent is an unprovisioned computer (lacking pre-installed software for use with one of the site coordinators). In further embodiments, a permanent agent includes an installed agent program. According to various embodiments and/or usage scenarios, a grid worker is one or more of: a temporary agent; and a permanent agent.

In some embodiments, a particular site coordinator is enabled to use a bootstrap technique to run an agent program on an unprovisioned worker, such as a temporary agent. In various embodiments, the particular site coordinator uses the bootstrap technique to run an agent program on the unprovisioned worker, and then uses the agent program to perform tasks, such as scanning files. In some embodiments, the agent program is ephemeral, and no files are permanently stored on the unprovisioned worker. In other embodiments, the agent program advantageously uses storage accessible by the unprovisioned worker, such as storage on a local disk of the unprovisioned worker, to store state between executions of the agent program. In various embodiments, the agent program saves a state file on the local disk for a future execution of the agent program (or a similar program), the state file including information pertaining to files of one of the site-specific storage volumes.

In some embodiments, the site-specific storage volumes that are local to particular site-specific workers are scanned by the particular site-specific workers. In some embodiments, the site-specific storage volumes that are site-global are scanned by one or more site-specific grid worker ones of the site-specific workers in a distributed fashion. In various embodiments, a respective state file includes a list of files of one or more particular site-specific storage volumes, and the respective state file is used, at least in part, to manage scanning of the particular site-specific storage volumes.

In various embodiments, a state file includes a plurality of work lists, each including a path header and a list of entries. The path header specifies a directory in a site-specific storage volume. The entries of the list are associated with respective entries of the directory (such as files of the directory). A site coordinator distributes scanning work to site-specific grid workers by assigning one or more of the work lists to one or more of the site-specific grid workers, one work list per site-specific grid worker. The site coordinator receives and accumulates results produced by the site-specific grid workers in response to the assigned work lists. In some embodiments and/or usage scenarios, the results include one or more modified work lists to be assigned to the site-specific grid workers as work lists. Grid workers use work lists to determine a list of files to scan.

In some embodiments, a particular agent (such as a permanent agent or a temporary agent) scans one of the site-specific storage volumes that is local to the particular agent using a particular state file, producing a modified state file as at least one result. According to various embodiments, the particular state file and/or the modified state file are one or more of: stored on a site coordinator; stored on local storage of the particular agent; and created dynamically. In further embodiments, the particular agent uses same or similar processes as a combination of a site coordinator and one or more grid workers to perform the scan. For example, in some embodiments, the particular agent acts as a site coordinator in apportioning one or more work lists from the particular state file and in accumulating results used to produce the new state file, and further acts as a grid worker in processing the work lists to produce the results. In various embodiments, the particular agent communicates results of the scan, such as a list of files requiring further attention, with a site coordinator. According to various embodiments, the further attention includes one or more of user-level reporting, reporting to an enterprise coordinator, and other special processing. For simplicity of nomenclature, a file (or entry of a directory) requiring further attention is termed a "flagged" file (or entry).

In some embodiments, each entry of the respective list of entries of a work list includes an abstract of an associated entry of a directory, and the directory is specified by the respective path header of the work list. In various embodiments, a particular abstract of a particular directory entry is a hash of at least some of the fields of the particular directory entry, such as a name field and a modification time field. In further embodiments, comparing the abstracts of the respective list of entries of a particular work list with current abstracts generated from entries of a particular directory enables rapid detection of changes to the directory. Examples include addition of entries, or changes to files of the directory (such as modification of a file). In various embodiments, use of work lists including abstracts of entries of a directory enables a scanning operation to be performed incrementally (and to solely scan changed entries).

Example Embodiments

In concluding the introduction to the detailed description, what follows is a collection of example embodiments, including at least some explicitly enumerated as "ECs" (Example Combinations), providing additional description of a variety of embodiment types in accordance with the concepts described herein; these examples are not meant to be mutually exclusive, exhaustive, or restrictive; and the invention is not limited to these example embodiments but rather encompasses all possible modifications and variations within the scope of the issued claims.

EC1) A system including:
  an enterprise coordinator;
  a plurality of site coordinators coupled to the enterprise coordinator, each site coordinator associated with a respective one of a plurality of sites, and each site coordinator managing one or more site-specific storage volumes;
  wherein each of the site coordinators further manages a respective one or more state files that describe a state of contents of at least a portion of the site-specific storage volumes;
  wherein at least some of the site coordinators further manage a site-specific plurality of grid workers to perform distributed scanning of at least some of the site-specific storage volumes; and
  wherein the enterprise coordinator controls a configuration of each of the site coordinators, and accumulates results from the site coordinators.

The system of EC1, wherein a particular one of the site coordinators is physically co-located with the site-specific storage volumes managed by the particular site coordinator.

The system of EC1, wherein
  the enterprise coordinator is coupled to an enterprise results database; and
  wherein the results from the site coordinators are accumulated, at least in part, in the enterprise results database.

The system of EC1, wherein the site-specific storage volumes of a site coordinator are located and/or managed at the respective site of the site coordinator.

The system of EC1, wherein the site-specific grid workers of a site coordinator are located and/or managed at the respective site of the site coordinator.

EC2) The system of EC1, wherein the enterprise coordinator processes the results from the plurality of sites.

The system of EC2, wherein the processed results are stored in an enterprise results database.

The system of EC2, wherein the processed results are determined, at least in part, by comparing the results with previous results stored in an enterprise results database.

The system of EC1, wherein the configuration includes a frequency of performing a scan operation.

EC3) The system of EC1, wherein the enterprise coordinator distributes fingerprints to one or more of the site coordinators.

The system of EC3, wherein the enterprise coordinator receives at least some of the fingerprints from one or more of the site coordinators.

The system of EC3, wherein at least some of the fingerprints are fingerprints of sensitive files.

The system of EC3, wherein one or more of the site coordinators use the fingerprints, at least in part, during the scanning.

The system of EC1, wherein the results include information related to sensitive files.

The system of EC1, wherein the results include scan-related statistics.

EC4) The system of EC1, wherein at least one of the site coordinators further manages one or more site-specific agents to perform local scanning of ones of the site-specific storage volumes that are local to ones of the site-specific agents.

EC5) The system of EC4, wherein at least some of the site-specific agents are temporary agents.

The system of EC5, wherein at least one of the temporary agents is a computer without special provisioning for scanning.

The system of EC5, wherein at least one of the temporary agents is a computer without special provisioning for running an agent program.

The system of EC4, wherein, for each of the at least one of the site coordinators, at least one of the respective state files describes a state of contents of at least some of the site-specific storage volumes that are local to the site-specific agents.

The system of EC4, wherein a same computers acts, at different times, as one of the site-specific agents and as one of the site-specific grid workers.

The system of EC4, wherein a same computers acts, at a same time, as both one of the site-specific agents and as one of the site-specific grid workers.

EC6) The system of EC1, wherein at least one of the respective state files includes one or more work lists.

The system of EC6, wherein workload of a particular one of the site coordinators scales linearly with a number of files represented in the one or more work lists.

EC7) A system including:
a site coordinator;
a plurality of workers coupled to the site coordinator, the workers including one or more agents and one or more grid workers;
wherein each of the agents is enabled to perform operations on respective local resources of the each agent;
wherein the grid workers are enabled to perform operations on global resources in a distributed manner; and
wherein the site coordinator is enabled to coordinate the performing of operations by the workers, and is further enabled to receive respective results from the workers.

EC8) The system of EC7, wherein each of the agents is a temporary agent or a permanent agent.

The system of EC8, wherein at least one of the temporary agents is a computer without special provisioning for scanning.

The system of EC8, wherein at least one of the temporary agents is a computer without special provisioning for running an agent program.

The system of EC7, wherein the respective local resources of a particular agent include files on a local file system of the agent.

EC9) The system of EC7, wherein the global resources include files resident on a network-based storage device.

The system of EC9, wherein the network-based storage device is one of a SAN, a NAS device, and a file server.

EC10) The system of EC7, wherein the site coordinator is enabled to apportion work to the grid workers from a current state file.

The system of EC10, wherein at least some of the respective results from the grid workers are appended to the current state file.

The system of EC10, wherein at least some of the respective results from the grid workers are added to a to-do list.

The system of EC10, wherein at least some of the respective results from the grid workers are concatenated into a new state file.

The system of EC7, wherein the site coordinator is enabled to load-balance work provided to the grid workers.

The system of EC7, wherein the operations performed by the agents and by the grid workers are scans of files.

The system of EC7, wherein, for each of the agents, the respective results include results of a scan of local files of the each agent.

EC11) The system of EC7, wherein, for each of the grid workers, the respective results include results of a respective scan of a respective set of global files, the respective set of global files found at a respective path provided by the site coordinator to the each grid worker.

EC12) The system of EC11, wherein the respective paths are part of a state file maintained by the site coordinator.

The system of EC12, wherein the state file includes one or more work lists.

The system of EC12, wherein each of the respective paths is specified in a respective work list of a plurality of work lists of the state file.

EC13) A method for scanning a plurality of files at a site, the method including:
controlling, via a site coordinator, each of one or more agents to perform a scan of a respective first subset of the files that includes local, to the each agent, ones of the files;
controlling, via the site coordinator, one or more grid workers to perform a distributed scan of a second subset of the files that includes global ones of the files; and
managing, by the site coordinator, a particular state file, the particular state file specifying the second subset of the files.

The method of EC13, wherein the particular state file includes one or more work lists.

The method of EC13, wherein the first subsets of the files are specified in the particular state file.

The method of EC13, wherein the first subsets of the files are specified in one or more other state files of the site coordinator.

EC14) The method of EC13, wherein each of the agents is a temporary agent or a permanent agent.

The method of EC14, wherein at least one of the temporary agents is a computer without special provisioning for scanning.

The method of EC14, wherein at least one of the temporary agents is a computer without special provisioning for running an agent program.

EC15) A method including:
controlling, via an enterprise coordinator, one or more site coordinators, each of the site coordinators being associated with a respective site;
controlling, via a first portion of the site coordinators, one or more agents to scan local files;
controlling, via a second portion of the site coordinators, one or more grid workers to scan global files; and
managing one or more state files specifying the global files.

The method of EC15, wherein each of the local files is locally accessible by one or more of the agents.

EC16) The method of EC15, wherein each of the global files is global to one of the respective sites.

The method of EC16, wherein each of the state files includes global files of one of the respective sites.

The method of EC15, wherein the scan of the global files is a distributed scan.

EC17) A method including:
controlling site coordinators, each associated with a respective site;
controlling agents to scan local files; and
controlling grid workers to scan global files.

The method of EC17, wherein the controlling of the agents is via a subset of the site coordinators.

The method of EC17, wherein the controlling of the grid workers is via a subset of the site coordinators.

The method of EC17, wherein some of the site coordinators perform the controlling of the agents and others of the site coordinators perform the controlling of the grid workers.

The method of EC17, further including managing state files specifying the global files.

The method of EC17, further including managing state files specifying the local files.

EC18) A method including:
 identifying files from a plurality of sites;
 controlling site coordinators, each associated with one of the sites;
 controlling agents to scan ones of the files that are local to the agents;
 controlling grid workers to scan ones of the files that are global to one of the sites; and
 managing state files specifying the global files.

EC19) A method for scanning a plurality of files across a plurality of sites, the method including:
 controlling, via an enterprise coordinator, each of a plurality of site coordinators, each site coordinator associated with a respective one of the plurality of sites;
 controlling, via each of at least a first portion of the site coordinators, each of one or more respective agents to perform a scan of a respective first subset of the files that includes local, to the each respective agent, ones of the files;
 controlling, via each of at least a second portion of the site coordinators, one or more respective grid workers to perform a distributed scan of a respective second subset of the files that includes global, to the respective site, ones of the files; and
 managing, for each of the at least the second portion of the site coordinators, a respective state file specifying the respective second subset of the files.

The method of EC19, wherein each of the respective state files includes one or more work lists.

The method of EC19, wherein at least one of the site coordinators is in the first portion and in the second portion.

The method of EC19, wherein, for each site coordinator, the first subsets of the files are specified in the respective state file.

The method of EC19, wherein, for each site coordinator, the first subsets of the files are specified in one or more other respective state files of the site coordinator.

EC20) The method of EC19, wherein each of the agents is a temporary agent or a permanent agent.

The method of EC20, wherein at one of the temporary agents is a computer without special provisioning for scanning.

The method of EC20, wherein at one of the temporary agents is a computer without special provisioning for running an agent program.

The method of EC19, further including receiving, by each of the at least the first portion of the site coordinators, results from the respective agents.

EC21) The method of EC19, further including receiving, by each of the at least the second portion of the site coordinators, results from the respective grid workers.

The method of EC21, further including:
 aggregating, by each of the at least the second portion of the site coordinators, the results; and
 reporting, by each of the at least the second portion of the site coordinators, the aggregated results to an enterprise coordinator.

EC22) A computer readable medium having a set of instructions stored therein which when executed by a processing element causes the processing element to perform functions including:
 providing a respective work list to each of one or more grid workers, each of the respective work lists including a respective directory path;
 receiving respective results communicated from each of at least some of the grid workers, each of the respective results including a respective list of zero or more new directories found at the respective directory path; and
 providing a new respective work list to each of all or any portion of the grid workers, the new work lists collectively including paths to all of the new directories.

The computer readable medium of EC22, wherein the processing element is a site coordinator.

The computer readable medium of EC22, wherein the processing element is at least a portion of a site coordinator.

The computer readable medium of EC22, wherein the list of new directories is empty.

EC23) The computer readable medium of EC22, wherein each of the work lists further includes a respective list of entries expected to be found at the respective directory path.

The computer readable medium of EC23, wherein the entries are one or more of files and directories.

The computer readable medium of EC23, wherein the entries are specified, at least in part, as a hash value.

The computer readable medium of EC23, wherein, for each directory in the respective lists of new directories, the respective list of entries of the respective work list is null.

The computer readable medium of EC22, further including apportioning a state file to, at least in part, produce the respective work lists.

EC24) A computer readable medium having a set of instructions stored therein which when executed by a processing element causes the processing element to perform functions including:
 receiving a portion of work, the portion including a directory path, and a list of zero or more file abstracts;
 reading at least some content of a directory at the directory path, the at least some of the contents including zero or more entries;
 generating, for at least a first subset of the entries, respective abstracts;
 comparing, for at least a second subset of the first subset of the entries, the respective generated abstracts and abstracts as specified by the received list of abstracts; and
 producing, in response to the comparing, an updated version of the portion of work, and a list of new ones of the entries that are directories.

The computer readable medium of EC24, wherein the processing element is a grid worker.

The computer readable medium of EC24, wherein the processing element is at least a portion of a grid worker.

The computer readable medium of EC24, wherein the list of new ones of the entries that are directories is empty.

The computer readable medium of EC24, further including returning results including the updated version of the portion of work, and the list of new directories.

The computer readable medium of EC24, wherein the entries are one or more of files and directories.

The computer readable medium of EC24, wherein the updated version of the portion of work is returned as a list of changes to the portion of work.

EC25) The computer readable medium of EC24, wherein the producing further produces a list of deleted ones of the entries.

EC26) The computer readable medium of EC25, wherein the list of deleted entries includes ones of the received abstracts not matching any of the respective generated abstracts of the second subset of the entries.

The computer readable medium of EC26,
wherein each of the received abstracts includes a respective category; and
wherein the results further include a list of any ones of the deleted entries having a particular value of the respective category.

The computer readable medium of EC25, wherein the results further include the list of deleted entries.

The computer readable medium of EC25, wherein each of the deleted entries is not included in the updated version of the portion of work.

The computer readable medium of EC24, wherein the portion of work is a work list.

EC27) The computer readable medium of EC24, wherein the producing further produces a list of new ones of the entries that are files.

The computer readable medium of EC27, wherein the list of new files includes file ones of the second subset of the entries having the respective generated abstracts not matching any of the received abstracts.

EC28) The computer readable medium of EC27, further including scanning at least some of new files to determine flagged ones of the new files.

The computer readable medium of EC28, wherein the results further include a list of the flagged ones of the new files.

The computer readable medium of EC27, wherein the results further include the list of new files.

The computer readable medium of EC27, wherein each of the new files is included in the updated version of the portion of work.

The computer readable medium of EC24, wherein the list of new directories includes directory ones of the second subset of the entries having the respective generated abstract not matching any of the received abstracts.

The computer readable medium of EC24, wherein the list of new directories is in the form of a work list for each of the new directories.

EC29) The computer readable medium of EC24, wherein the updated version of the portion of work includes the respective generated abstracts of at least some of the second subset of the entries.

The computer readable medium of EC29, wherein the at least some of the second subset of the entries are ones of the second subset of the entries that are not directories.

The computer readable medium of EC29, wherein the updated version of the portion of work includes the directory path.

The computer readable medium of EC24, wherein the updated version of the portion of work includes differences between the respective generated abstracts of the second subset of the entries and the received abstracts.

EC30) The computer readable medium of EC24, wherein the portion of work further includes a range specification.

EC31) The computer readable medium of EC24, wherein the second subset of the entries are ones of the first subset of the entries having respective generated abstracts falling within the range specification.

The computer readable medium of EC31, wherein if the range specification is null or missing, the second subset of the entries is identical to the first subset of the entries.

EC32) The computer readable medium of EC30, further including.
enumerating the respective generated abstracts falling within the range specification to produce a number of the respective generated abstracts falling within the range specification;
if the number is less than or equal to a threshold, then selectively performing the comparing, wherein the second subset of the entries is ones of the first subset of the entries having respective generated abstracts falling within the range specification; and
if the number is greater than the threshold, then partitioning the range specification into a plurality of sub-divided range specifications, and returning a respective sub-portion of work for each of the sub-divided range specifications.

The computer readable medium of EC32, wherein for each of the sub-divided range specifications, each of the respective sub-portions of work includes the respective generated abstracts falling within the sub-divided range specification.

The computer readable medium of EC32, wherein for each of the sub-divided range specifications, each of the respective sub-portions of work includes the directory path and the sub-divided range specification.

The computer readable medium of EC32, wherein each of the sub-portions of work includes a work list.

The computer readable medium of EC32, wherein the partitioning is, at least in part, via sub-dividing the range specification.

EC33) The computer readable medium of EC24, wherein the respective abstract of a particular one of the entries includes a hash of a name of the particular entry.

The computer readable medium of EC33, wherein the hash further incorporates attributes of the particular entry, the attributes including one or more of
a modification date of the particular entry,
a creation date of the particular entry,
an access date of the particular entry,
access rights of the particular entry,
a path to the particular entry,
a type of the particular entry,
a size of the particular entry, and
a portion of the particular entry.

EC34) A computer readable medium having a set of instructions stored therein which when executed by a processing element causes the processing element to perform functions including:
apportioning respective sections of a current state file to one or more grid workers for processing;
receiving respective results communicated from each of at least some of the grid workers; and
concatenating, for each of at least some of the respective results, a portion of the each respective results to a new state file.

The computer readable medium of EC34, wherein the processing element is a site coordinator.

The computer readable medium of EC34, wherein the processing element is at least a portion of a site coordinator.

EC35) The computer readable medium of EC34, further including selectively, based on a type of at least a portion of each of the respective results:

adding the portion of the each respective results to a to-do list, concatenating the portion of the each respective results to a new state file, or not including the portion of the each respective results in any state file or to-do list.

EC36) The computer readable medium of EC35, further including apportioning respective sections of the to-do list to one or more grid workers for processing.

The computer readable medium of EC36, wherein the apportioning of the current state file is done in preference to the apportioning of the to-do list.

The computer readable medium of EC36, wherein the apportioning of the to-do list is done in preference to the apportioning of the current state file.

The computer readable medium of EC35, wherein the adding is via appending

The computer readable medium of EC35, wherein the adding is via prepending.

EC37) The computer readable medium of EC34, further including sending, at least in part, the respective sections of the current state file to the one or more grid workers.

The computer readable medium of EC37, wherein the sending is via a network.

The computer readable medium of EC37, wherein the sending of the respective sections of the current state file modifies a form of the information in the respective sections prior to the sending.

The computer readable medium of EC34, further including after the receiving respective results from a particular one of the grid workers, apportioning another respective section of the current state file to be processed by the particular grid worker.

The computer readable medium of EC34, wherein the current state file includes one or more work lists.

The computer readable medium of EC34, wherein all of the current state file is apportioned.

The computer readable medium of EC34, wherein a portion of the current state file that is not apportioned is added to the new state file.

The computer readable medium of EC34, further including:

replacing the current state file with the new state file; and repeating at least the apportioning.

EC38) The computer readable medium of EC34, further including reading the current state file from a storage medium.

The computer readable medium of EC38, wherein the current state file is too large to be entirely contained in a random access memory of the processing element.

The computer readable medium of EC38, wherein the current state file is over 1 GB in size.

The computer readable medium of EC38, wherein the current state file is over 10 GB in size.

EC39) The computer readable medium of EC34, wherein the current state file includes a plurality of file system paths and, for each path, respective file information.

EC40) The computer readable medium of EC39, wherein the respective file information of a path includes summaries of zero or more files and/or directories at the path.

EC41) The computer readable medium of EC40, wherein the summary of a particular file of the zero or more files and/or directories includes a hash of a name of the particular file.

The computer readable medium of EC41, wherein the hash further incorporates attributes of the particular file, the attributes including one or more of a modification date of the particular file,
a creation date of the particular file,
an access date of the particular file,
access rights of the particular file,
a modification date of the particular file,
a path to the particular file,
a type of the particular file,
a size of the particular file, and
a portion of the particular file.

The computer readable medium of EC34, wherein the respective results communicated by a particular grid worker include an updated version of the respective section of the current state file.

EC42) The computer readable medium of EC34, wherein the respective results communicated by a particular grid worker include a list of new directories found at a path provided in the respective section of the current state file.

The computer readable medium of EC42, wherein directories of the list of new directories are added to one or more of the current state file, a to-do list, and a new state file.

EC43) The computer readable medium of EC34, wherein the respective results communicated by each of the grid workers include a respective list of flagged files.

EC44) The computer readable medium of EC43, further including: reporting the respective lists of flagged files.

The computer readable medium of EC44, wherein the reporting is to an enterprise coordinator.

EC45) The computer readable medium of EC34, further including:

maintaining a list of active grid workers, each active grid worker having been apportioned the respective section of the current state file, and not having communicated the respective results; and in the event of a failure of one of the active grid workers, restarting the respective section of the state file of the failed grid worker on another grid worker.

The computer readable medium of EC45, wherein after a particular grid worker communicates the respective results, the particular grid worker is apportioned another section of the current state file.

EC46) The computer readable medium of EC45, wherein a number of active grid workers is adjusted dynamically to achieve a system performance metric.

The computer readable medium of EC46, wherein the system performance metric includes one or more of a maximum number of active grid workers,
a minimum number of active grid workers,
a load on a network accessed by the active grid workers,
a load on a network storage device by the active grid workers, and
a load on the processing element.

EC47) Communications on a computer network between a site coordinator and one or more agents, the communications including:

a bootstrap request from the site coordinator to a first agent to start an executable bootstrap program on the first agent;

a transfer from the site coordinator to the first agent of an executable agent program;

a command from the site coordinator to an agent program on a second agent;

a result of the command from the agent program on the second agent to the site coordinator.

The communications of EC47, wherein the first agent is the same as the second agent.

EC48) The communications of EC47, wherein each of the agents is either a temporary agent or a permanent agent.

The communications of EC48, wherein the first agent is a temporary agent.

The communications of EC48, wherein the second agent is not a temporary agent.

The communications of EC48, wherein the agent program on the second agent is a result of running the executable agent program.

The communications of EC47, further including a command from the site coordinator to the bootstrap program on the first agent to install the executable agent program.

The communications of EC47, further including a command from the site coordinator to the bootstrap program on the first agent to execute the executable agent program.

EC49) The communications of EC47, further including a file transfer request from the site coordinator to the agent program on the second agent, the file transfer request including a file name, a file length and file contents.

EC50) The communications of EC49, wherein the agent program stores the file contents in a file cache.

The communications of EC50, wherein the file contents are accessible by the file name.

EC51) The communications of EC47, wherein the bootstrap request includes the executable bootstrap program.

The communications of EC51, wherein the executable bootstrap program is communicated, at least in part, via a Windows®-compatible StartService function.

EC52) The communications of EC47, wherein the transfer of the executable agent program is via a first named pipe.

The communications of EC52, wherein the first named pipe is provided by a service started by the bootstrap program.

EC53) The communications of EC47, wherein the command to the agent program is via a second named pipe.

The communications of EC53, wherein the second named pipe is provided by a service started by the agent program.

EC54) The communications of EC47, wherein the command is one or more of a task command, a file transfer command, and a file request command.

The communications of EC54, wherein the task command is one or more of a task control command or a task status command.

The communications of EC54, wherein the file transfer command includes a file length, and file contents.

EC55) Communications on a computer network between a site coordinator and one or more grid workers, the communications including:
  for each of at least some of the grid workers, a respective portion of a current state file from the site coordinator to a respective agent program on the each grid worker;
  results from the respective agent program on a particular one of the grid workers to the site coordinator, the results including an updated version of the respective portion of the current state file, and a list of new directories; and
  wherein contents of a particular directory specified in the respective portion of the current state file of the particular grid worker includes a list of entries, the new directories being among the entries.

The communications of EC55, wherein updated version of the respective portion of the current state file includes the list of new directories.

The communications of EC55, wherein the updated version of the respective portion of the current state file is communicated as a list of changes to the respective portion of the current state file.

The communications of EC55, wherein the list of new directories is in the form of a portion of the current state file for each of the new directories.

The communications of EC55, wherein the current state file includes one or more work lists.

EC56) The communications of EC55, wherein the portion of the current state file includes a directory path of the particular directory, and a list of zero or more file abstracts.

EC57) The communications of EC56, wherein the respective agent program on the particular grid worker, in response to receiving the portion of the current state file, reads contents of the particular directory, the contents including a list of zero or more entries.

EC58) The communications of EC57, wherein each of the entries is a file or a directory.

EC59) The communications of EC58, wherein the respective agent program on the particular grid worker further in response to receiving the portion of the current state file generates respective abstracts for each of at least some of the entries.

The communications of EC59, wherein the list of new directories includes directory ones of the at least some of the entries having the respective generated abstract not matching any of the received abstracts.

The communications of EC59, wherein the respective agent program on the particular grid worker further in response to receiving the portion of the current state file performs a scan on particular ones of the at least some of the entries, the particular entries being files and having the respective generated abstract not matching any of the received abstracts.

EC60) The communications of EC55, further including:
  a command from the site coordinator to the respective agent program on the particular grid worker; and
  a result of the command from the respective agent program on the particular grid worker to the site coordinator.

The communications of EC60, wherein the command is one or more of a task query, a task start, a task stop, and a file transfer.

The communications of EC55, wherein each of the respective portions of the current state file is sent via a file transfer command.

The communications of EC55, further including:
  a bootstrap request from the site coordinator to the particular grid worker to start an executable bootstrap program on the particular grid worker;
  a transfer from the site coordinator to the particular grid worker of an executable agent program; and
  wherein the agent program on the particular grid worker is a result of running the executable agent program.

EC61) A method including:
  assigning an element to a first worker, the element including a range;
  receiving a response from the first worker;
  based at least in part on the response, sub-dividing the range of the element into two or more sub-divided ranges; and
  assigning a derived element including a particular one of the sub-divided ranges to a second worker.

The method of EC61, wherein the first worker and the second worker are a same worker.

The method of EC61, wherein the range of the element is implicit.

The method of EC61, wherein the sub-dividing is performed by the first worker.

The method of EC61, wherein the sub-dividing is selectively performed based on a number of items determined by the first worker based, at least in part, on the element.

EC62) The method of EC61, wherein the element further includes a directory path and a list of expected files.

The method of EC62, wherein the list of expected files is in the form of a respective hash value for each of the expected files.

EC63) The method of EC62, further including reading, by the first worker, a directory at the directory path, contents of the directory including a list of zero or more entries.

The method of EC63, wherein each of the entries is a file or a directory.

EC64) The method of EC63, further including:
hashing, by the first worker, each of the entries; and
enumerating, by the first worker, a number of the entries that are within the range.

EC65) The method of EC64, further including selectively performing the sub-dividing if the number is more than a threshold.

The method of EC65, wherein the derived element includes the directory path.

The method of EC65, wherein the derived element consists of the directory path and the particular sub-divided range.

EC66) The method of EC65, wherein the derived element further includes a list of the ones of the files of the list of expected files falling within the particular sub-divided range.

The method of EC66, wherein the list is in the form of a respective hash value for each of the files.

EC67) The method of EC61, wherein the derived element further includes a list of the ones of the entries that are files and that fall within the particular sub-divided range.

The method of EC67, wherein the list is in the form of a respective hash value for each of the files.

EC68) The method of EC61, wherein for each of the sub-divided ranges, the element and the each of the sub-divided ranges is assigned to a respective worker.

EC69) The method of EC68, wherein at least two of the respective workers are a same worker.

The method of EC69, wherein the assigning to the same worker is serialized contingent on the same worker sending a respective response.

EC70) A method including:
receiving an element from a controlling agent, the element including a directory path;
determining a number of particular ones of entries in a directory at the directory path associated with the element;
if the number is greater than a threshold, then providing a response of a first type to the controlling agent; and
if the number is less than or equal to the threshold, then providing a response of a second type to the controlling agent.

The method of EC70, further including receiving a range from the controlling agent.

The method of EC70, wherein the threshold is predetermined

EC71) The method of EC70, wherein the threshold is adjusted dynamically.

The method of EC71, wherein the threshold is adjusted dynamically based on a load average.

The method of EC70, wherein the response of the first type includes the number.

The method of EC70, wherein the response of the second type includes information on flagged ones of the particular entries in the directory.

EC72) The method of EC70, wherein the response of the second type includes information on ones of the particular entries in the directory that are new directories.

The method of EC72, wherein the element further includes a list of hash values; and wherein a notable one of the particular entries is new if a hash value computed, at least in part, from a name of the notable entry is not present in the list of hash values.

EC73) The method of EC70, wherein contents of the directory include a list of zero or more items, each of the items specifying a respective one of the particular entries in the directory.

The method of EC73, wherein each of the particular entries is a file or a directory.

EC74) The method of EC70, wherein the element further includes a range, and contents of the directory include a list of zero or more items, each of the items falling within the range specifying a respective one of the particular entries in the directory.

The method of EC74, wherein the particular entries are one or more of files and directories.

The method of EC74, wherein each item includes a respective name; and wherein a particular one of the items falls within the range if a portion of a hash value computed, at least in part, from the respective name of the particular item falls within the range.

The method of EC74, wherein the response of the first type includes a list of sub-divisions of the range.

EC75) A method including:
computing a respective hash value for each of one or more entries of a directory based, at least in part, on a respective name of the each entry;
comparing the respective hash value of the each entry with hash values of a list of hash values; and
determining that the each entry has changed if the respective hash value is not in the list.

EC76) The method of EC75, wherein the computing for a particular one of the entries that is of a file type is further based on a timestamp of the particular entry.

The method of EC76, wherein the timestamp is one or more of
a last access time,
a modification time, and
a creation time.

EC77) The method of EC76, wherein the timestamp includes a modification time.

EC78) The method of EC77, wherein a particular one of the entries of the directory is a particular restored file, and the particular entry is determined to have not changed.

The method of EC78, wherein the particular restored file is restored with an original timestamp.

The method of EC75, wherein the computing for an entry that is of a directory type is not based on a timestamp of the entry.

The method of EC75, wherein the computing is further based, at least in part, on
one or more of
a type of the each entry,
access rights of the each entry,
a path to the each entry,
a size of the each entry, and
a portion of the each entry.

EC79) The method of EC75, further including:
reading contents of the directory, the contents including the one or more entries; and
determining a list of changed entries as ones of the entries with a respective hash value not in the list.

The method of EC79, wherein each of the entries is a file or a directory.

EC80) The method of EC79, wherein a particular entry that has been restored in a manner that restores a modification time timestamp is determined to have been changed if a respective hash value of the entry is not in the list of hash values.

The method of EC80, wherein the particular entry is not determined to have been changed if the respective hash value is in the list of hash values.

EC81) A system for walking files in a file system, the system including:
- a list of a prior state of entries in the file system, the list including a plurality of units, each unit including a respective directory path and zero or more respective summaries of entries found at a directory at the respective directory path;
- a work partitioner enabled to apportion the list so that from each unit one or more pieces of work are derived, each of the pieces of work derived from a particular one of the units including the respective directory path of the particular unit, and some or all of the respective summaries;
- a plurality of workers, each worker enabled to receive one of the pieces of work, to read the directory at the respective directory path producing at least a portion of contents of the directory, to compare the portion of the contents of the directory and the respective summaries, and to produce a respective list of differences; and
- wherein the respective lists of differences include new, modified, or deleted ones of entries of the file system.

The system of EC81, wherein the entries are one or more of files and directories.

The system of EC81, wherein a particular directory path appears in multiple ones of the units.

The system of EC81, wherein at least some of the units further include a range specification.

EC82) A file system state file of use in walking files in a file system, including:
- a plurality of elements, each element including a respective directory path and a respective zero or more abstracts, each of the abstracts including a respective hash value; and
- wherein for each element, and for each respective abstract of the each element, the respective hash value is associated with a corresponding entry of a directory at the respective directory path of the each element, the respective hash value being computed, at least in part, from a hash function of fields of the corresponding entry.

EC83) The file system state file of EC82, wherein a partitioning unit apportions the state file into pieces of work, assigns the pieces of work to workers, accumulates results from the workers, and concatenates a portion of at least some of the results to produce an updated version of the state file.

The file system state file of EC83, wherein the updated version of the state file includes a snapshot of contents of the file system.

The file system state file of EC83, wherein each element is apportioned into one of the pieces of work.

EC84) The file system state file of EC83, wherein at least one element is apportioned into more than one of the pieces of work.

The file system state file of EC84, wherein each of the more than one pieces of work includes the respective directory path of the at least one element.

The file system state file of EC84, wherein each of the more than one pieces of work includes some of the respective abstracts of the at least one element.

The file system state file of EC82, wherein the elements further include a range specification.

System

FIG. 1 illustrates selected details of an embodiment of a system having an enterprise coordinator and a plurality of site coordinators. In some embodiments, enterprise coordinator 110 communicates over a network with a plurality of site coordinators 120, 130, and 140. As illustrated in FIG. 1, the network includes WAN segments 113.0, 113.1, and 113.2. According to various embodiments, the network includes one or more of: a single WAN; a single LAN; any combination of WAN and/or LAN segments; and any combination of network and/or computer communication devices and/or mediums. Similarly, FIG. 1 illustrates several LANs, such as LAN 111 coupling enterprise coordinator 110 to enterprise results database 112, and LAN 141 coupling site coordinator 140 to state files and results 142. According to various embodiments, any of the LANs of FIG. 1 includes one or more of: a single WAN; a single LAN; any combination of WAN and/or LAN segments; a direct connection, such as a computer backplane connection; a computer I/O bus, such as PCI Express; network I/O communications, such as Fibre Channel or iSCSI; and any combination of network and/or computer communication devices and/or mediums. In further embodiments, at least some WANs and/or LANs illustrated in FIG. 1 are abstractions for portions of a single LAN or WAN or network. For example, in some embodiments, any or all of LAN 141, LAN 143, and LAN 145 are operable as a single LAN. As another example, in some embodiments, LAN 133 includes WAN 113.2.

Continuing in FIG. 1, enterprise coordinator 110 is coupled via LAN 111 to enterprise results database 112. In some embodiments, enterprise results database 112 stores results accumulated from one or more of site coordinators 120, 130, and 140. In various embodiments, enterprise coordinator 110 aggregates and/or processes results from site coordinators 120, 130, and 140 prior to storing them in enterprise results database 112. In some embodiments, some or all of the results, either before or after aggregating/processing, are reported, such as via a human-readable interface (e.g., a log file, E-mail, or any other human-readable format), and/or via a machine-readable interface (e.g., a binary data file, a spreadsheet, or any other machine-readable format).

In various embodiments, enterprise coordinator 110 communicates scheduling and/or configuration information to one or more of site coordinators 120, 130, and 140. Similar to enterprise results database 112, each of the site coordinators has, in some embodiments, respective local storage for results and other information (respective state files and results 122, 132, and 142 coupled via respective LANs 121, 131, and 141). According to various embodiments, the respective state files and results of a particular site coordinator include one or more of:
- state files;
- results, optionally aggregated and/or processed, from one or more site-specific workers coupled to the particular site coordinator;
- scheduling and/or configuration information;
- agent programs; and
- other programs and/or data files used by the particular site coordinator.

As illustrated in FIG. 1, each site coordinator is coupled to one or more workers. For example, site coordinator 140 is coupled via LAN 143 to workers 149, including permanent agents 148, temporary agents 146, and one or more grid workers 144. (Similarly, site coordinator 120 is coupled via LAN 123 to permanent agents 128 and to temporary agents 126, and site coordinator 130 is coupled via LAN 133 to permanent agents 138 and to temporary agents 136.)

According to various embodiments, temporary agents, permanent agents and grid workers include one or more of: laptops; personal computers; workstations; blade servers; and any computing device attached to a network. In some embodiments, permanent agents include an agent program enabled to communicate with one of the site coordinators. In some embodiments, temporary agents are enabled to use a bootstrap technique under control of one of the site coordinators to run an agent program. According to various embodiments, grid workers include one or more of: temporary agents; and permanent agents.

In some embodiments, permanent agents and temporary agents have agent-local storage, such as a local disk drive. In various embodiments, grid workers are enabled to access site-global storage. For example, as illustrated with regard to site coordinator 140, grid workers 144 are coupled via LAN 145 to site-global storage represented as network storage 147. According to various embodiments, the site-global storage is additionally coupled to one or more of: temporary agents 146; permanent agents 148; site coordinator 140; and other computing and/or network devices of a site. In some embodiments, network storage 147 includes state files and results 142. In some embodiments, network storage 147 includes enterprise results database 112. In various embodiments, network storage 147 is any type of storage medium, at least in part, accessible to the grid workers. For example, in some embodiments, network storage 147 is distributed storage, a portion of which is directly coupled to each of the grid workers. According to various embodiments, network storage 147 includes one or more of: a SAN; NAS; a disk farm; a file server; and a RAID system.

Figure 2:
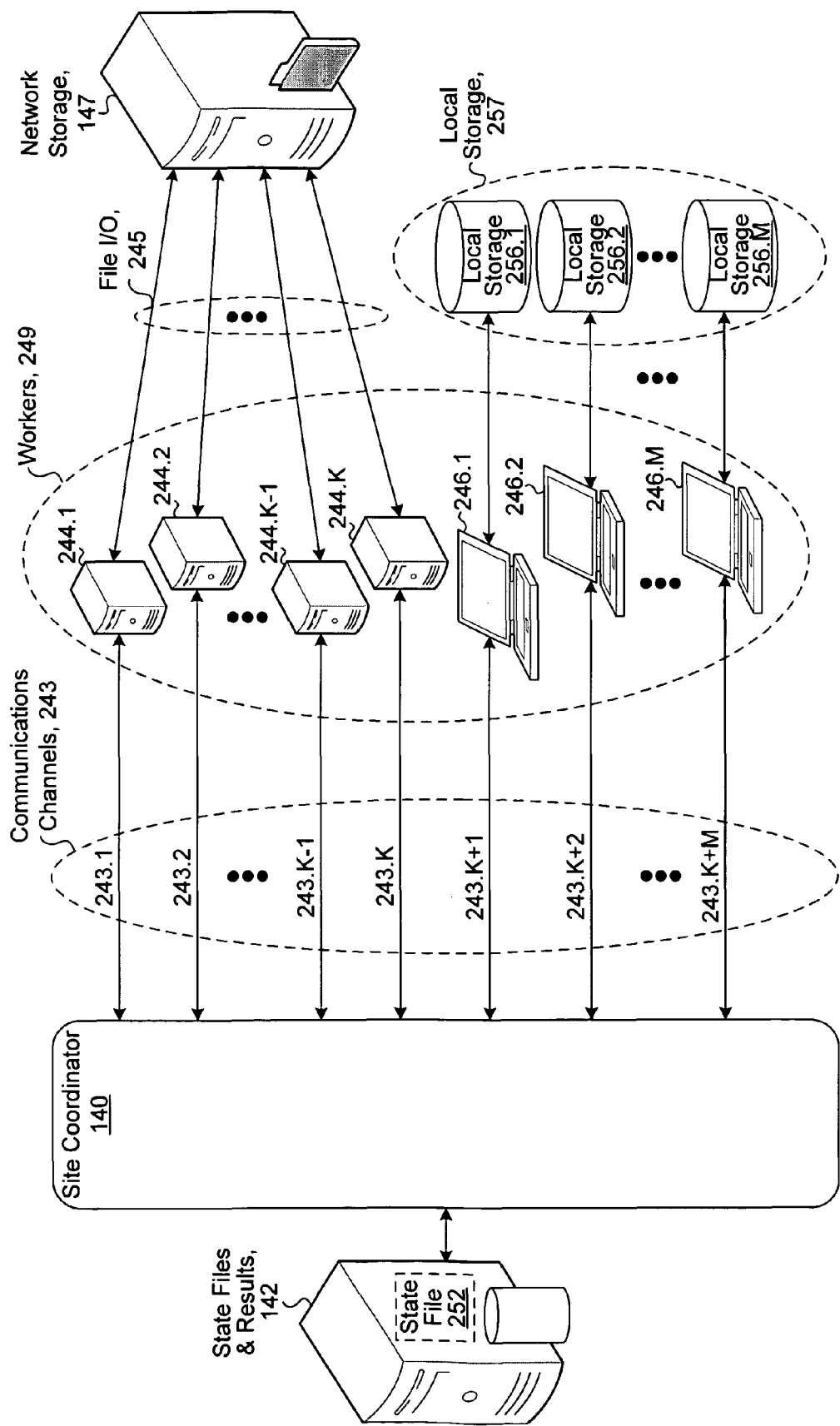
FIG. 2 illustrates selected details of an illustrative embodiment of a system having a site coordinator and resources managed by the site coordinator.

FIG. 2 illustrates selected details of an embodiment of a system having a site coordinator and resources managed by the site coordinator. In some embodiments, site coordinator 140 is coupled to an enterprise coordinator, such as enterprise coordinator 110 of FIG. 1. In other embodiments, site coordinator 140 operates without an enterprise coordinator.

In some embodiments, site coordinator 140 is coupled to state files and results 142 including state file 252. According to various embodiments, state files and results 142 includes one or more of: local storage of site coordinator 140; a portion of network storage 147; and other network storage accessible by site coordinator 140. In some embodiments, site coordinator 140 manages state file 252 and/or uses state file 252 to apportion work to one or more workers.

In some embodiments, site coordinator 140 is coupled by a number of communications channels (243.1 to 243.K+M) to one or more workers 249. In various embodiments, communications channels 243.1 to 243.K+M are the same as or similar to LAN 143 of FIG. 1. In various embodiments, communications channels 243.1 to 243.K+M are network communications paths between site coordinator 140 and workers 249. For example, according to various embodiments, communications channels 243.1 to 243.K+M include one or more of: UDP, TCP and/or TCP/IP connections; sockets; remote service invocations; and other network communications protocols.

As illustrated in FIG. 2, workers 249 include grid workers 244.1 to 244.K and agents 246.1 to 246.M. In various embodiments, grid workers 244.1 to 244.K are the same as or similar to grid workers 144 of FIG. 1. In various embodiments, agents 246.1 to 246.M are the same as or similar to temporary agents 146 and/or permanent agents 148 of FIG. 1.

In some embodiments, each of agents 246.1 to 246.M is coupled to respective agent-local storage 256.1 to 256.M, collectively local storage 257. For example, local storage 256.1 is, in some embodiments, a local disk of agent 246.1, such as a disk installed in a laptop. In various embodiments, the respective agent-local storage of a particular agent includes one or more local disks or other storage media containing one or more file systems, each file system holding one or more directories, each directory holding one or more entries, the entries being files, lower-level directories, or other file-system-specific entities.

In some embodiments, each of grid workers 244.1 to 244.K is coupled to site-global storage, such as to network storage 147, via file I/O 245. In various embodiments, the site-global storage includes one or more disks or other storage media containing one or more file systems, each file system holding one or more directories, each directory holding one or more entries, the entries being files, lower-level directories, or other file-system-specific entities. File I/O 245 represents communications between the grid workers and the site-global storage, such as communications to read, to write, to access, and/or to modify any of the directories, files, or other entities of the site-global storage. In some embodiments, file I/O 245 is communicated via LAN 145 of FIG. 1. In some embodiments, file I/O 245 uses, at least in part, a Fibre Channel medium. In various embodiments, network storage 147 is accessible, at least in part, by one or more of: site coordinator 140; grid workers 244.1 to 244.K; agents 246.1 to 246.M; and other computing and/or networking devices coupled to a network interconnecting some or all of the site coordinator, the grid workers, the agents, and the site-global storage.

Figure 3:
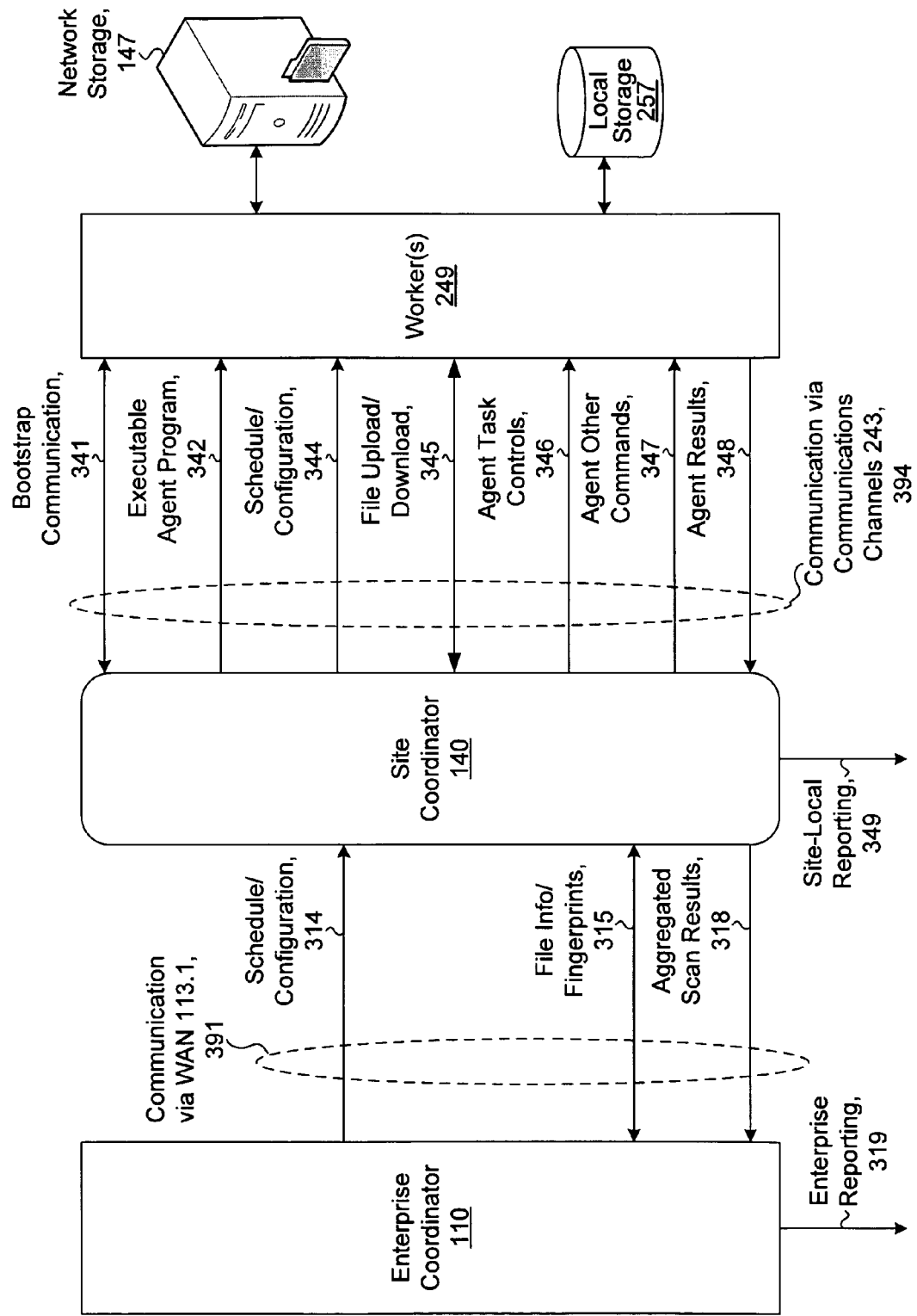
FIG. 3 illustrates selected details of an illustrative embodiment of communications among components in a system.

FIG. 3 illustrates selected details of an embodiment of communications among components in a system. As illustrated in FIG. 3, enterprise coordinator 110 is coupled to site coordinator 140, site coordinator 140 is coupled to workers 249, and workers 249 are coupled to storage, such as local storage 257 and network storage 147.

According to various embodiments, workers 249 are coupled to site coordinator 140, and communications between workers 249 and site coordinator 140 include one or more of: bootstrap communications 341; executable agent program 342; scheduling and/or configuration information 344; file upload/download 345; agent task controls 346; other agent commands 347; and agent results 348. In some embodiments, the communications between the workers and the site coordinator ("Communications via Communications Channels 243" 394) are sent via communications channels, such as communications channels 243 of FIG. 2.

According to various embodiments, site coordinator 140 is coupled to enterprise coordinator 110, and communications between site coordinator 140 and enterprise coordinator 110 include one or more of: scheduling and/or configuration information 314; file information and/or fingerprints 315; and aggregated scan results 318. In some embodiments, the communications between the site coordinator and the enterprise coordinator ("Communications via WAN 113.1" 391) are sent via a network, such as WAN 113.1 of FIG. 2. In some embodiments, the communications between the site coordinator and the enterprise coordinator uses one or more communications channels, similar to communications channels 243 of FIG. 2. In some embodiments and/or usage scenarios, site coordinator 140 is either not coupled to or does not communicate with an enterprise coordinator.

In some embodiments, site coordinator 140 generates site-local reporting 349, such as by writing the results to a log file, by sending the results in E-mail, or by producing any other human-readable and/or machine-readable output. In some embodiments, enterprise coordinator 110 generates enterprise-wide reporting 319, such as by writing the results to a log file, by sending the results in E-mail, or by producing any other human-readable and/or machine-readable output.

In some embodiments, site coordinator 140 controls the scheduling, configuration, and execution of tasks on workers 249. According to various embodiments, the workers include one or more of: permanent agents having an installed agent program; and temporary agents that do not have a permanently installed agent program. In some embodiments, permanent agents run tasks, such as an agent program, at scheduled times, such as in response to scheduling and/or configuration information 344. In some embodiments, temporary agents are bootstrapped (such as via bootstrap communications 341), and receive an agent program (such as via executable agent program 342). In various embodiments, workers are commanded to run tasks (such as via agent task controls 346 and/or other agent commands 347). According to various embodiments, site coordinator 140 performs, via file upload/download 345, one or more of: downloading files to one or more of the workers, such as files to be used by tasks; and uploading files from one or more of the workers, such as files produced by tasks. In further embodiments, workers return results, such as agent results 348. In some embodiments, a portion of a state file, such as a portion of state file 252 of FIG. 2, is downloaded to a particular one of the workers by site coordinator 140.

In some embodiments, enterprise coordinator 110 controls the scheduling, configuration, and execution of tasks on site coordinator 140 and/or on workers 249 via scheduling and/or configuration information 314. In some embodiments and/or usage scenarios, scheduling and/or configuration information is "pushed down" from the enterprise coordinator to the workers via the site coordinators. In further embodiments, the site coordinator runs tasks, such as results aggregation and/or processing tasks, in response to scheduling and/or configuration information 314.

In some embodiments, enterprise coordinator 110 receives information concerning particular files stored on local storage 257 and/or network storage 147 via file information and/or fingerprints 315. In some embodiments, file information and/or fingerprints received from a first site coordinator, such as site coordinator 140, by enterprise coordinator 110 are forwarded to a second site coordinator. In further embodiments, enterprise coordinator 110 aggregates and/or processes the received file information and/or fingerprints before forwarding aggregated/processed file information and/or fingerprints to the second site coordinator.

In some embodiments, an agent program run on one or more of workers 249 performs a scan of at least a portion of local storage 257 and/or network storage 147. According to various embodiments and/or usage scenarios, the agent program is run as, or in response to, one or more of: a scheduled task (such as via scheduling and/or configuration information 344); bootstrap communications (such as via bootstrap communications 341); and an agent task command (such as via agent task controls 346). In further embodiments, different agent programs, and/or different versions of a same agent program, are run on different ones of the workers. In some embodiments, the agent program processes a work list provided by the site coordinator (such as via file upload/download 345). In various embodiments, the agent program(s) report respective results to site coordinator 140 via agent results 348. In some embodiments, agent results 348 include file information and/or fingerprints of selected ones of files resident on local storage 257 and/or network storage 147. According to various embodiments, agent results 348 include one or more of: status of a task; status of an agent; lists of flagged files; lists of new directories; and modified (updated) work lists.

In some embodiments, site coordinator 140 aggregates and/or processes results returned from the agent program(s), and reports site-local results, such as via site-local reporting 349. In further embodiments, site coordinator 140 communicates aggregated results of the scans to enterprise coordinator 110 via aggregated scan results 318. In still further embodiments, site coordinator 140 communicates some or all of the file information and/or fingerprints received via agent results 348 to enterprise coordinator 110. Enterprise coordinator 110 aggregates and/or processes results returned from one or more site coordinators, such as site coordinator 140, and reports enterprise-wide results, such as via enterprise reporting 319.

Work Lists and State Files

Figures 4A, 4B, 4C:
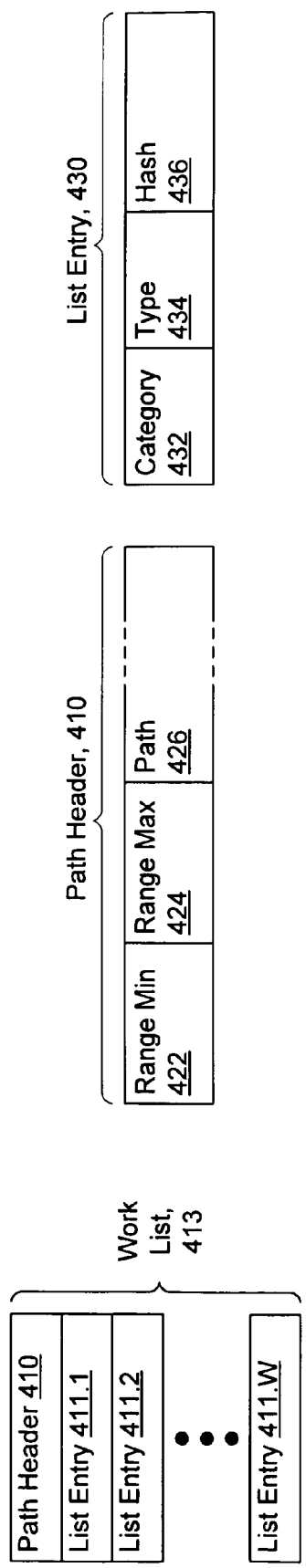
FIGS. 4A-4C illustrate selected details of illustrative embodiments of data structures used in a work list.

FIGS. 4A-4C illustrate selected details of embodiments of data structures used in a work list. FIG. 4A illustrates a format of a work list as used in some embodiments. Work list 413 includes path header 410 and zero or more list entries 411.1 to 411.W. In some embodiments, the path header includes a pointer, such as a path, to a directory on either agent-local or site-global storage. In some embodiments, each of the list entries includes information about an entry, such as a file, of the directory. In various embodiments, work list 413 represents a summary (as of a time the work list was created) of a directory and of at least a portion of contents of the directory. Accordingly, entries of a directory are said to be a portion of, or to be in, a work list.

In some embodiments, work list 413 includes information used for integrity checking, such as a length and a CRC. For example, when work lists are written (such as to a disk), they are prepended with a respective length, and appended with a respective CRC protecting contents of the work list. When work lists are read, the respective length and the respective CRC are used to verify the integrity of the work list.

FIG. 4B illustrates a format of path header 410 as used in work list 413. According to various embodiments, path header 410 includes one or more of: minimum range specification 422, maximum range specification 424; and path specification 426. In some embodiments, the path specification is an identifier of a directory, such as a path, an I-node number, a disk block number, and/or any identifier of the directory. In various embodiments, the path is local to a particular file system or to a particular portion of a file system. In other embodiments, the path is global to a site and/or to an enterprise.

In some embodiments, the directory specified by path 426 includes zero or more entries, each entry identifying entities in the file system, such as lower-level directories, files, or other entities specific to various file systems. In further embodiments, one or more of minimum range specification 422 and maximum range specification 424 enable work list 413 to be associated with a subset of the entries of the directory. For example, in some embodiments, minimum range specification 422 specifies a minimum value of a portion of, or a minimum value of a function of, a directory entry for the directory entry to be associated with the work list. Similarly, in some embodiments, maximum range specification 424 specifies a maximum value of a portion of, or a maximum value of a function of, a directory entry for the directory entry to be associated with the work list. In various embodiments, some or all of respective fields of each entry of the directory are processed by a hash function producing a respective hash value, and the minimum range specification and/or the maximum range specification specify a range of values of at least a portion of the respective hash values. Directory entries having respective hash values within the range (e.g., more than the minimum range specification and less than the maximum range specification) are associated with the work list.

FIG. 4C illustrates a format of list entry 430, representing any one of list entries 411.1 to 411.W as used in work list 413. According to various embodiments, list entry 430 includes one or more of: category 432, type 434, and hash 436. Each list entry corresponds to a directory entry observed in a directory at a path as specified in a path header of a work list including the list entry. In some embodiments, type 434 is a type of the directory entry, such as whether the directory entry is for a file, for a lower-level directory, or for some other file-system specific entity. In some embodiments, category 432 specifies information obtained during previous processing of the directory and/or the directory entry. According to various embodiments, category 432 includes one or more of: an indication that the directory entry had a particular scan result; and an indication that a particular directory entry was skipped on a previous scan.

In some embodiments, hash 436 includes a hash value produced by a hash function of some or all fields of the directory entry. In some embodiments, different subsets of the fields are hashed for different types of directory entries. For example, a directory entry of a file type hashes a file name and a modification time, whereas a directory entry of a lower-level directory type hashes a directory name but not a modification time.

According to various embodiments, an abstract of a directory entry includes one or more of: a hash; and a type. In further embodiments, a list entry includes an abstract of a directory entry. In various embodiments, a particular abstract of a particular directory entry is compared against a list of abstracts to determine if the particular directory entry is substantially unchanged since the list of abstracts was created, or whether the particular directory entry is new or has changed in some fashion.

Figure 5:
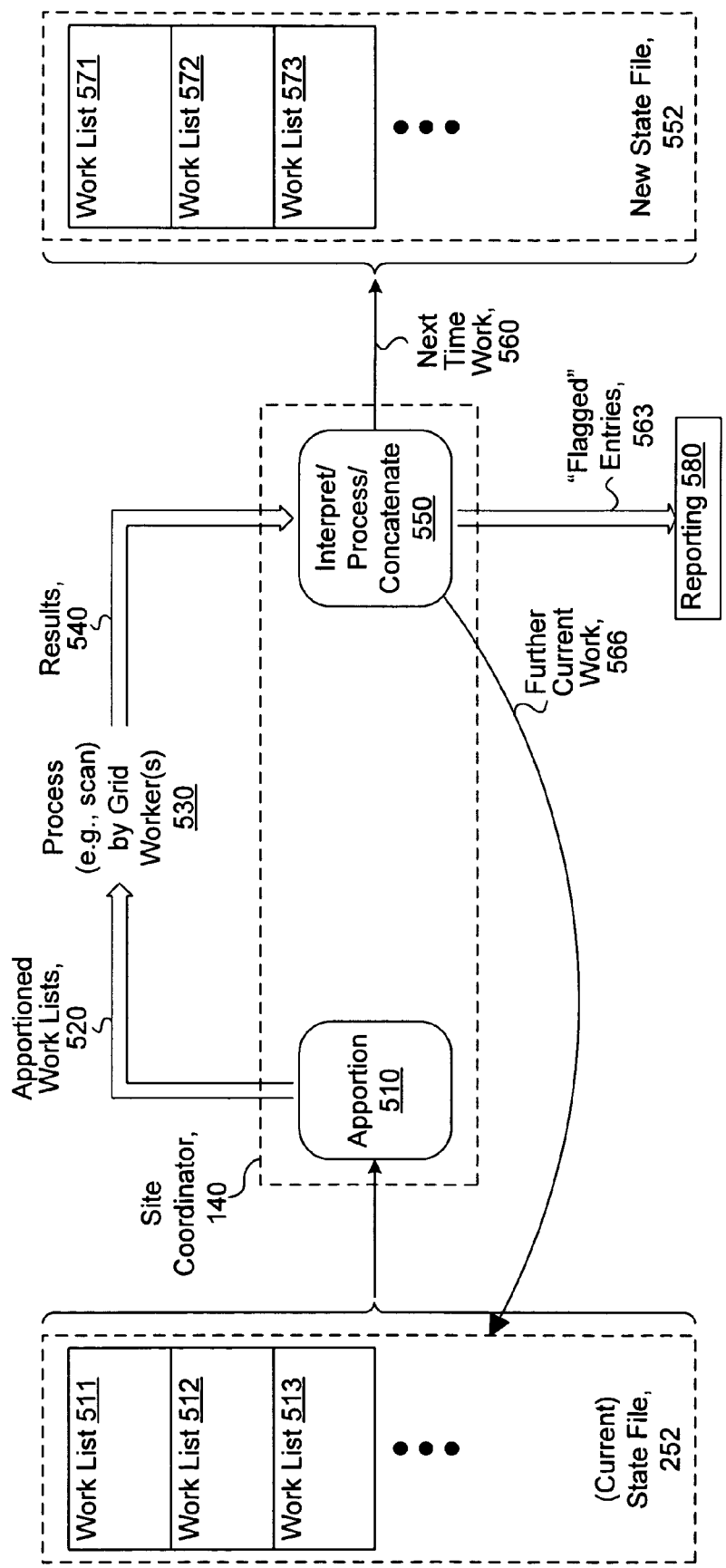
FIG. 5 illustrates selected details of an illustrative embodiment of a system operating on a state file.

FIG. 5 illustrates selected details of an embodiment of a system operating on a state file. In some embodiments, state file 252 includes a plurality of work lists (511, 512, 513, . . . ) each of which is, in format, the same as or similar to work list 413 of FIG. 4. In further embodiments, the state file is processed by a series of operations (510, 530, and 550) producing, at least in part, further work lists. According to various embodiments, the further work lists include one or more of: further current work 566, which, in some embodiments, is added to state file 252 for further processing; and next time work 560, which, in some embodiments, is added to new state file 552. New state file 552 includes a plurality of work lists (571, 572, 573, . . . ) each of which is, in format, the same as or similar to work list 413 of FIG. 4. In various embodiments, new state file 552 is stored on a storage device, such as state files & results 142 of FIG. 2, similar to a manner in which state file 252 is stored.

In some embodiments, a state file includes a header. According to various embodiments, the header includes one or more of: a cursor position; and a list of one or more scan groups. In various embodiments, the cursor position indicates a point of progress in apportioning of a particular state file. In some embodiments, the scan groups define portions of a directory structure that are to be scanned. For example, the scan groups define a list of rooted directories at which scanning starts, and other rooted directories not in the scan groups are not scanned. In various embodiments, the scan groups are included in the state file as global "dummy" work lists at a beginning of the state file. In further embodiments, the global work lists used for scan groups are processed similarly to other work lists, enabling addition of elements to the list of scan groups. In some embodiments and/or usage scenarios, during apportioning of work lists from the state file, each of the work lists is compared against the scan groups, and solely work lists having a respective path (in a respective path header of the work list) matching one of the scan groups are apportioned. For example, deletion of one of the scan groups (because that portion of the directory structure no longer requires scanning) causes particular work lists having a respective path within the deleted scan group to not be apportioned.

In some embodiments, after processing state file 252, new state file 552 replaces state file 252 and processing resumes, operating on the replaced state file 252. In other embodiments and/or usage scenarios, processing is suspended before completion of processing of state file 252, and an unprocessed portion of state file 252 is added to new state file 552; new state file 552 then replaces state file 252 and processing resumes. In still other embodiments, work continually circulates through a single state file. For example, in some embodiments, further current work 566 is prepended to state file 252 (enabling further current work 566 to be processed more rapidly), and next time work 560 is appended to (the end of) state file 252. In yet other embodiments, a particular work list of state file 252 that for some reason is not currently processed by the series of operations, is instead added to one of state file 252 or new state file 552. For example, a path represented by the particular work list, such as by a path in a path header of the particular work list, is (temporarily) inaccessible (for example, due to a network or to a file system outage). Rather than some other techniques to queue the particular work list, the particular work list is added back into one of the state files. In some embodiments, a path header of a work list includes additional information indicating if processing of the particular work list was skipped.

Continuing in FIG. 5, operations 510 and 550 are performed, in some embodiments, on a site coordinator, such as site coordinator 140 of FIG. 2. State file 252 is apportioned (510) into apportioned work lists 520. In some embodiments, each work list in state file 252 is apportioned into one apportioned work list. In other embodiments, some work lists in state file 252 are apportioned into more than one apportioned work list. For example, in some embodiments, if a number of list entries in a work list exceeds a threshold, the work list is divided into multiple apportioned work lists, each of the multiple apportioned work lists having a copy of the path header, and each of the multiple apportioned work lists having a number of the list entries less than the threshold. In yet other embodiments, multiple work lists in state file 252 are combined into a single combined apportioned work list. In various embodiments, a combined apportioned work list has one or more path headers.

Further in FIG. 5, apportioned work lists 520 are processed 530 by one or more grid workers, such as by grid workers 244.1 to 244.K of FIG. 2. In some embodiments, a particular apportioned work list is provided to a respective grid worker by a site coordinator, such as by a file download (for example, file upload/download 345 of FIG. 3). In some embodiments, the site coordinator commands an agent program on the respective grid worker to process the particular apportioned work list (such as via agent task controls 346 of FIG. 3). In various embodiments, the agent program performs operations relating to a directory as specified in a path header of the particular apportioned work list. In further embodiments, the agent program performs operations relating to one or more entries of the directory as specified by a range specification of the path header, and/or as specified by list entries of the particular apportioned work list. In some embodiments, each of the grid workers returns respective results 540 in response to respective apportioned work lists apportioned to each grid worker (such as via agent results 348 of FIG. 3). According to various embodiments, the respective results from a particular grid worker apportioned a respective apportioned work list include one or more of: one or more modified versions of the respective apportioned work list, the modifications based, at least in part, on a current contents of a directory specified by a path header of the respective apportioned work list; a list of new, lower-level directories found in the directory; a list of sub-divided portions of the directory; results of scans of zero or more files of the directory; and statistics. In some embodiments, the list of new, lower-level directories and/or the list of sub-divided portions of the directory include one or more work lists. According to various embodiments, the results of scans include one or more of: a list of flagged directory entries; a list of list entries having a particular category and not having a corresponding (matching) directory entry; and fingerprints or other information of particular files. According to various embodiments, the statistics include one or more of: statistics of the particular grid worker; statistics from execution of the agent program; and statistics from the processing done by the agent program.

In various embodiments, results from one or more grid workers are interpreted, processed, and/or concatenated (550), producing output including one or more of: further current work 566; next time work 560; and flagged entries 563. In some embodiments, further current work 566 includes the list of new, lower-level directories and/or the list of sub-divided portions of the directory. In other embodiments, next time work 560 includes the list of new, lower-level directories and/or the list of sub-divided portions of the directory. In various embodiments, next time work 560 includes the modified versions of the respective apportioned work list. In some embodiments, certain portions of the results, such as flagged entries 563, are communicated, such as via reporting 580. According to various embodiments, reporting 580 represents one or more of: site-local reporting, such as site-local reporting 349 of FIG. 3; and reporting to an enterprise coordinator, such as file information and/or fingerprints 315 and/or aggregated scan results 318 of FIG. 3.

In some embodiments, results from a grid worker include a list of new and/or sub-divided directories. In further embodiments, the list of new and/or sub-divided directories is in the form of a work list for each of the new and/or sub-divided directories. In various embodiments, the list of new and/or sub-divided directories is added to a to-do list. In further embodiments, further current work 566 is added to the to-do list. In some embodiments, work lists are apportioned from the to-do list in preference to work-lists from state file 252. In other embodiments, work lists are apportioned in some other fashion, such as alternately, from the to-do list and from state file 252. In still other embodiments, the to-do list is processed only after state file 252 has been fully apportioned. In some embodiments, the list of new and/or sub-divided directories is not in the form of a work list for each of the new and/or sub-divided directories, and the to-do list includes two types of entries: child directory entries from the list of new and/or sub-divided directories, and parent directory entries that have been processed and expanded into the form of a work list.

In some embodiments and/or usage scenarios, processing of a state file is optionally interrupted by planned or unplanned interrupts. For example, a site coordinator performing the apportioning crashes. In further embodiments, when the processing is interrupted, work (in the form of work lists apportioned to grid workers) is in progress, and results are optionally not returned for the in-progress work. In some embodiments, efficient recovery uses a cursor stored in a header of new state file 552, the cursor indicating a position in state file 252 where work was last apportioned. While completed work has returned results that are reflected in new state file 552, and work not yet started is indicated by the cursor position, it is not known precisely what work was in progress. In some embodiments, a site coordinator is adapted to resume the processing by restarting the apportioning. To restart the apportioning, a portion of state file 252 before the cursor position is compared with new state file 552. Work lists that are present in state file 252 but are not reflected (such as by the presence of a work list having a same respective path) in new state file 552 are assumed to have been in progress, and are added to a to-do list.

Figure 6:
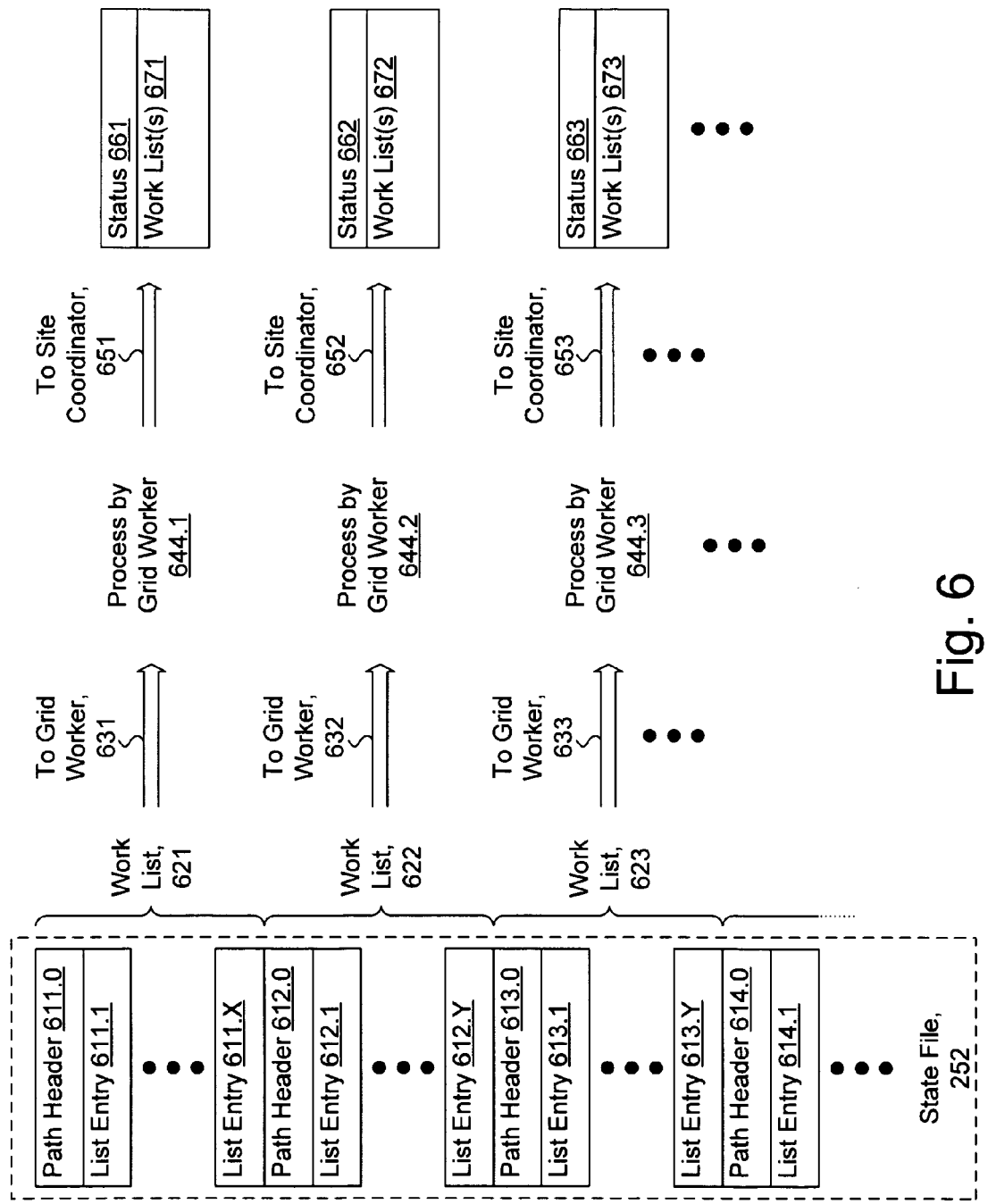
FIG. 6 illustrates selected details of an illustrative embodiment of a portion of a system processing a plurality of work lists.

FIG. 6 illustrates selected details of an embodiment of a portion of a system processing a plurality of work lists. In some embodiments, state file 252 includes a plurality of work lists (621, 622, 623, ... ) each of which is, in format, the same as or similar to work list 413 of FIG. 4. For example, as illustrated in FIG. 6, work list 621 includes path header 611.0 and zero or more list entries 611.1 to 611.X; similarly, work list 622 includes path header 612.0 and zero or more list entries 612.1 to 612.Y; and work list 623 includes path header 613.0 and zero or more list entries 613.1 to 613.Z.

In some embodiments, work lists 621, 622, 623, ... are apportioned and respectively communicated (631, 632, 633, . . . ) for respective processing by grid workers (644.1, 644.2, 644.3, ... ), such as by grid workers 244.1 to 244.K of FIG. 2. In various embodiments, communications to (631, 632, 633, ... ) and from (651, 652, 653, ... ) the grid workers are via one or more communications channels with a site coordinator, such as communications channels 243 of FIG. 2.

As illustrated in FIG. 6, the respective processing is, in some embodiments, performed in a parallel fashion, with two or more work lists processed at a same time by two or more grid workers. In some embodiments, a number of work lists exceeds a number of grid workers, and each of a plurality of grid workers processes one or more work lists. In some embodiments, a particular grid worker is apportioned a plurality of work lists. In further embodiments, the particular grid worker processes two or more work lists at least partially overlapping in time. In other embodiments, the particular grid worker processes the two or more work lists serially. In some embodiments, a grid worker is apportioned a first work list, and subsequent to the grid worker returning respective results, the grid worker is apportioned a second work list. In some embodiments, the processing of all of the work lists is performed by a single grid worker.

The respective processing produces results that are respectively communicated (651, 652, 653, ... ), for example to a site coordinator (such as site coordinator 140 of FIG. 2). According to various embodiments, results of the respective processing include one or more of: respective status indications (661, 662, 663, ... ); and one or more respective result work lists (671, 672, 673, ... ). According to various embodiments, the respective status indications include one or more of: an indication of success or failure of the respective processing; and other results of the processing not included in the respective work lists. According to various embodiments, each of the respective result work lists include one or more of: a list of new or sub-divided directories in a form of a work list for each new or sub-divided directory; one or more work lists in a form of further current work, such as further current work 566 of FIG. 5; and one or more work lists in a form of next time work, such as next time work 560 of FIG. 5.

Directories

Figure 7:
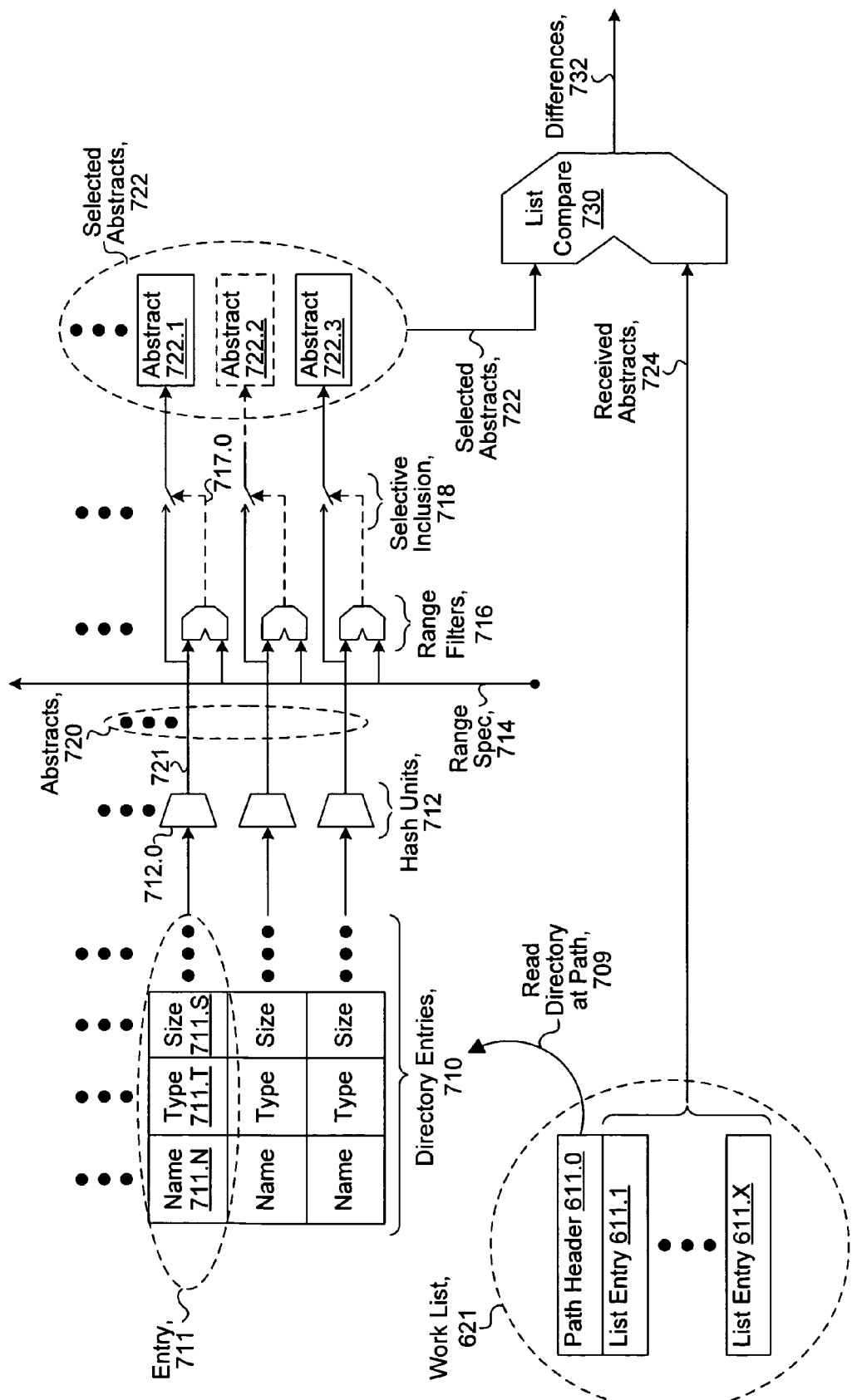
FIG. 7 illustrates selected details of an illustrative embodiment of processing for comparing abstracts of selected directory entries with a list of abstracts.

FIG. 7 illustrates selected details of an embodiment of processing for comparing abstracts of selected directory entries with a list of abstracts. In some embodiments, FIG. 7 illustrates a portion of the function of blocks 1028, 1050, and 1052 of FIG. 10.

In some embodiments, a grid worker, such as one of grid workers 244.1 to 244.K of FIG. 2, processes a work list, as illustrated by processing 644.1 of FIG. 6 operating on work list 621. With reference again to FIG. 7, according to various embodiments, the grid worker performs processing and other functions including one or more of:

obtaining a path from a path header (such as path header 611.0);

reading some or all of contents of a directory at the path (709) to produce zero or more directory entries (such as directory entries 710);

operating on each of the directory entries, such as via hash units 712, to produce a set of abstracts (such as abstracts 720);

filtering the set of abstracts, such as via range filters 716, to determine a subset of the abstracts that are in a specified range (such as range specification 714);

selecting a selected subset of the set of abstracts (such as selected abstracts 722) by using the results of the filtering (such as via selective inclusion switches 718);

obtaining a list of received abstracts from list entries of the work list (such as received abstracts 724 obtained from list entries 611.1 to 611.X);

comparing the selected abstracts and the received abstracts, such as via list compare 730; and producing output (such as differences 732) based on results of the comparing.

According to various embodiments, the grid worker performs the processing and the other functions in one or more of: hardware; software; firmware; microcode; and any equivalent thereof.

In various embodiments, each of the list entries of the work list includes a respective abstract, these abstracts collectively being received abstracts 724. A processed version of directory entries 710, selected abstracts 722, is compared with received abstracts 724 by list compare 730 to produce differences 732. In some embodiments, differences 732 are returned as at least a portion of results from the grid worker in response to the work list, such as via communications 651 of FIG. 6, or via agent results 348 of FIG. 3.

As illustrated in FIG. 7, a plurality of directory entries 710 are obtained from a directory, such as by reading some or all of contents of the directory. Each directory entry, such as directory entry 711, includes one or more fields. For example, directory entry 711 includes name 711.N, size 711.S, type 711.T, and other fields.

Continuing in FIG. 7, each of directory entries 710 is hashed by a respective one of hash units 712 to produce, at least in part, a respective abstract of each directory entry, collectively abstracts 720. For example, directory entry 711 is hashed by respective hash unit 712.0 to produce, at least in part, respective abstract 721 of abstracts 720. According to various embodiments, the respective abstract of a particular one of the directory entries includes one or more of: a hash value produced by a hash function operating on one or more of the fields of the particular directory entry; and a type of the particular directory entry. In some embodiments, the respective abstract of a particular one of the directory entries includes at least some fields (or functions thereof) of the particular directory entry. In various embodiments and usages scenarios, the respective abstract of a particular one of the directory entries includes an identifier of the particular directory entry, such as an index identifying the particular directory entry among the directory entries.

In some embodiments, each of abstracts 720 is filtered by a respective one of range filters 716, producing a respective control signal (such as control signal 717.0) used by a respective one of selective inclusion switches 718. Based on the respective control signal, the respective selective inclusion switch accepts or rejects each abstract for inclusion in selected abstracts 722. Accordingly, zero or more of the abstracts are determined to be in a range passed by the range filters, and selected abstracts 722 includes the zero or more abstracts. In some embodiments, range filters 716 compare some or all of respective hash values of the abstracts with a minimum range specification and a maximum range specification, enabling the abstracts of the directory entries that have a respective hash value, or a specified portion of a respective hash value, between the minimum range specification and the maximum range specification to be accepted by selective inclusion switches 718. In various embodiments, the minimum range specification and the maximum range specification are provided in a path header of a work list, such as minimum range specification 422 and maximum range specification 424 of FIG. 4B. For example, in some embodiments, the minimum range specification and the maximum range specification are 32-bit numbers that are compared with a pre-determined, 32-bit portion of the respective hash value of each of the abstracts. The selected abstracts are those abstracts where the 32-bit portion of the respective hash value is between the minimum range specification and the maximum range specification. In other embodiments, the minimum range specification and the maximum range specification are bit masks (such as a mask/value pair) applied to a portion of the respective hash value of each of the abstracts. In various embodiments, the range filters operate in other ways, such as by selecting a certain range of the directory entries in a particular order, or by selecting a certain portion of the directory entries with file names in a certain range.

In some embodiments, selected abstracts 722 are compared with received abstracts 724 by list compare 730. According to various embodiments, differences 732 produced by list compare 730 include one or more of:

a list of abstracts in received abstracts 724 not found in selected abstracts 722;

a list of abstracts in received abstracts 724 not found in selected abstracts 722 and having a particular category in a respective list entry;

a list of abstracts in selected abstracts 722 not found in received abstracts 724;

a list of abstracts in selected abstracts 722 not found in received abstracts 724 and having a directory type; and a list of abstracts in selected abstracts 722 not found in received abstracts 724 and having a non-directory type.

Figure 8:
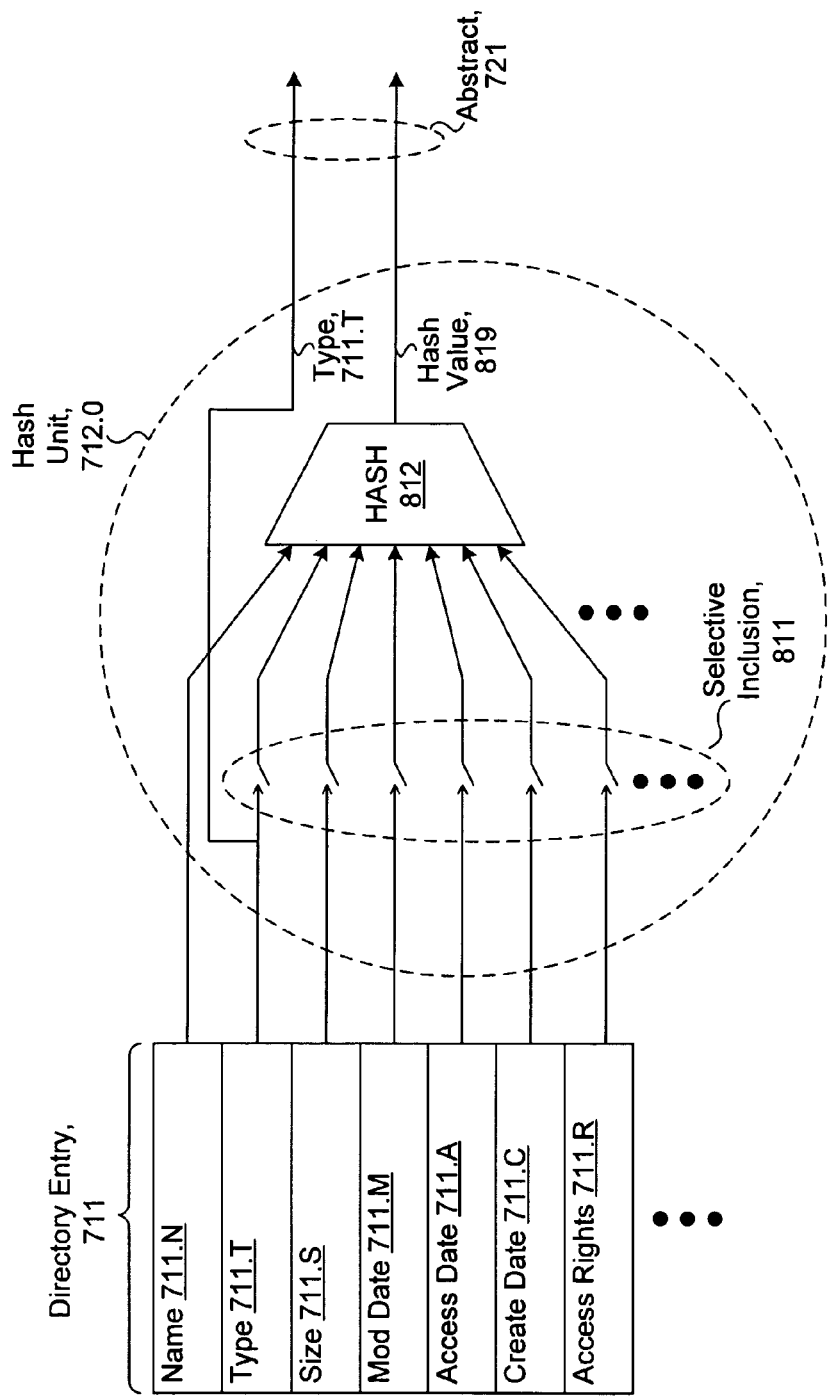
FIG. 8 illustrates selected details of an illustrative embodiment of generating an abstract including a hash value from a directory entry.

FIG. 8 illustrates selected details of an embodiment of generating an abstract including a hash value from a directory entry. According to various embodiments, directory entry 711 includes one or more fields: name 711.N; type 711.T; size 711.S; modification date 711.M; access date 711.A; creation date 711.C; and access rights 711.R. In some embodiments, directory entry 711 includes other fields not illustrated in FIG. 8. A subset of the fields, as selected by selective inclusion 811, is input to a hash generator, such as hash function 812, producing hash value 819. In some embodiments, the hash function is an MD5 hash. In some embodiments, the hash value is 32 bytes in size. According to various embodiments, the fields selected by selective inclusion 811 are chosen according to one or more of: a static configuration choice; a dynamic choice based on the type of the directory entry; a user-configurable choice; a per-directory choice; a per-file-system choice; a per-site choice; and any implementation-based choice. In some embodiments, a name field of the directory entry is always an input to hash function 812. In some embodiments, a modification date of the directory entry is always an input to hash function 812. In some embodiments, a modification date of the directory entry is an input to hash function 812 if the type is a non-directory type, and is not an input to hash function 812 if the type is a directory type.

According to various embodiments, abstract 721 includes one or more of: hash result 819; type 711.T; and other fields of the directory entry. Abstract 721 represents a summary of the directory entry that is used to determine if the file system entity represented by the directory entry has changed. In some embodiments, a conservative determination that the file system entity represented by the directory entry has changed is produced, at least in part, from abstract 721. In various embodiments, abstract 721 is used, among other inputs, to produce a determination that the file system entity represented by the directory entry has changed, and the determination optionally produces a false positive, but produces a false negative only with a vanishingly small probability.

Work List and State File Processing

Figure 9A:
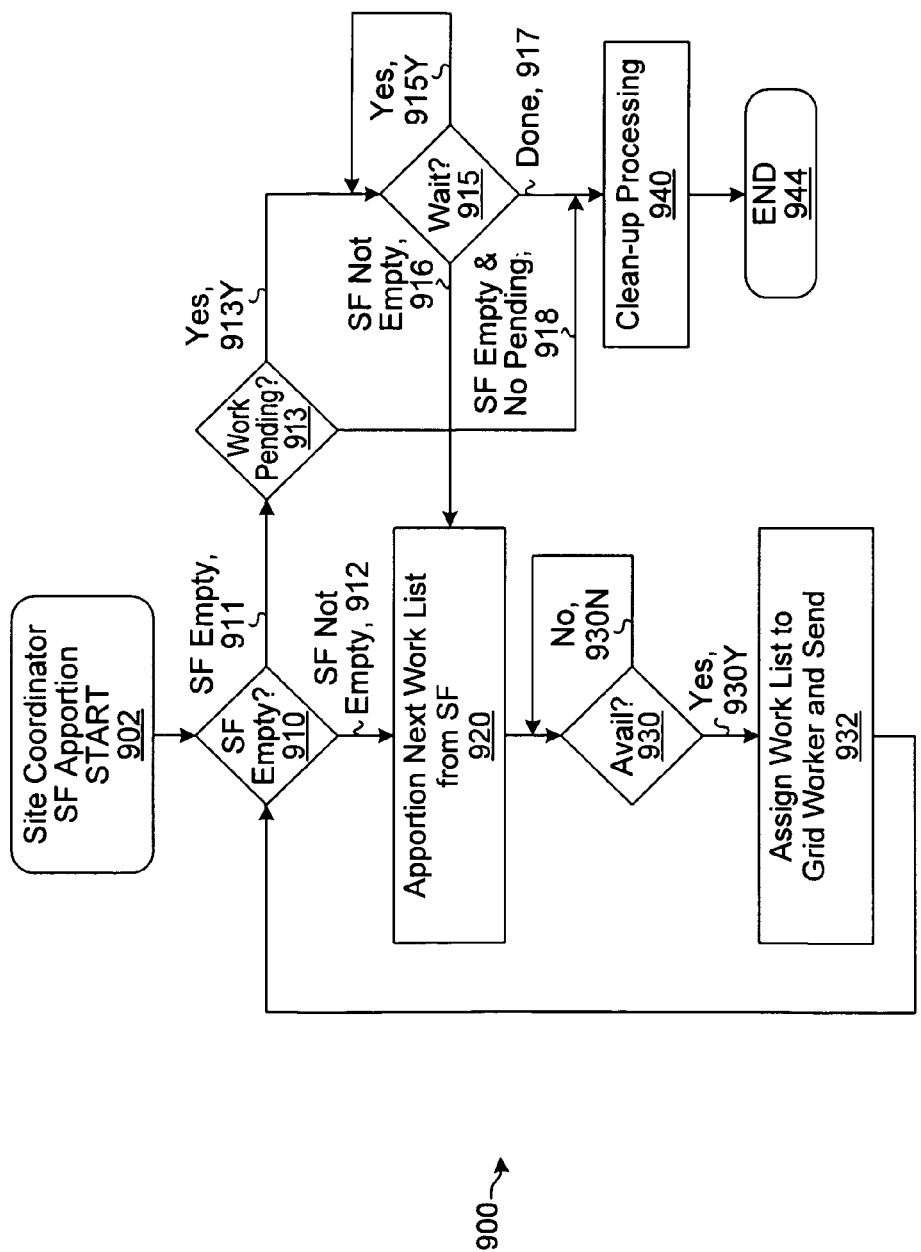
FIG. 9A illustrates selected details of a process used in an illustrative embodiment to apportion a state file.

FIG. 9A illustrates selected details of a process used in an embodiment to apportion a state file. In some embodiments, process 900 is used on a site coordinator, such as site coordinator 140 of FIG. 2. In various embodiments, operation of process 900 by a site coordinator apportions a state file (such as state file 252 of FIG. 2) into a plurality of work lists, assigning each of the work lists to one or more grid workers, such as grid workers 244.1 to 244.K of FIG. 2. In further embodiments, one or more of the grid workers are enabled to add further work lists, such as illustrated by further current work 566 of FIG. 5, to the state file. In some embodiments, process 900 performs some or all of a function of an apportion operation (510) of FIG. 5. In various embodiments, each of the work lists has a format the same as or similar to that of work list 413 of FIG. 4A.

In various embodiments, process 900 starts (902), and determines whether a State File (SF) is empty (910). In some usage scenarios, the state file is empty when all of the work lists of the state file have been assigned to grid workers. In some usage scenarios, the state file is optionally transitorily empty after all of the work lists of the state file have been assigned to grid workers, but prior to one or more of the grid workers adding one or more further work lists to the state file. If the state file is empty (911), a determination is made as to whether there is pending work (913). In some embodiments, there is pending work when there are one or more grid workers that have been assigned a respective work list, but have not yet returned results.

If the state file is empty (911) but there is pending work (913Y), process 900 waits for completion of either all of the pending work, or at least some of the pending work that on completion adds to the state file (915, looping back until work pending or state file addition via 915Y).

If all work is complete ("Done" 917), or if the state file is empty and there is no pending work ("SF Empty & No Pending" 918), then process 900 performs any necessary clean-up (940), such as deallocating data structures or closing communications channels, and terminates (944).

If the state file is not empty ("SF Not Empty" 912 or "SF Not Empty" 916), a next work list is apportioned from the state file (920). Process 900 then waits for an available one of the grid workers (930, looping back until available via 930N). In some embodiments, availability of a grid worker depends on factors such as, but not limited to, a load average, a file system utilization, and a network utilization. When the available grid worker is determined (930Y), the next work list is assigned to the available grid worker, and the next work list is sent to the available grid worker (932). Process 900 then repeats the earlier determination as to whether the state file is empty (910).

In some embodiments, assigning a respective work list to a grid worker (such as in block 932) includes tracking the assignment in a list of assignments. The tracking includes one or more of: an association between grid workers and respective work lists; times (e.g., wall-clock time) of assignments to grid workers of respective work lists; and, for each assignment, information identifying each assignment in the list of assignments. According to various embodiments, failure of a grid worker is detected as one or more of: an administrative report of failure of the grid worker; a lack of a periodic heartbeat from the grid worker; a failure of the grid worker to respond to a query, such as a task query; and a failure of the grid worker to return results in response to a respective work list within a specified time period. In the event of a failure of a grid worker after an assignment of a respective work list and prior to returning results in response to the respective work list, the respective work list is assigned to another grid worker. Work lists include identifying information to provide disambiguation of multiple results returned in response to a work list, such as one or more of: timestamps; counters; MAC addresses; IP addresses; and other identifying information. For example, a work list is assigned to a first grid worker, the work list including a counter ID having a value of 1, and subsequently the first grid worker fails to respond to a query and is presumed to have failed. The work list is then assigned to a second grid worker (such as, at least in part, by appending or prepending the work list to a state file), the work list now including the counter ID having a value of 2. As an illustrative example, a subsequent response from the first grid worker is distinguishable from a response from the second grid worker because a value of the counter ID is not that of the last assignment of the work list.

According to various embodiments, sending a respective work list to a grid worker (such as in block 932) includes one or more of: communicating the respective work list, such as via file upload/download 345; and commanding an agent to process the respective work list, such as via agent task controls 346. According to various embodiments, the respective work list is sent as, or via, one or more of: a communications channel, such as one of communications channels 243 of FIG. 2; embedding the respective work list in an agent program; and any other techniques suitable for communicating data from a site coordinator to a worker.

Figure 9B:
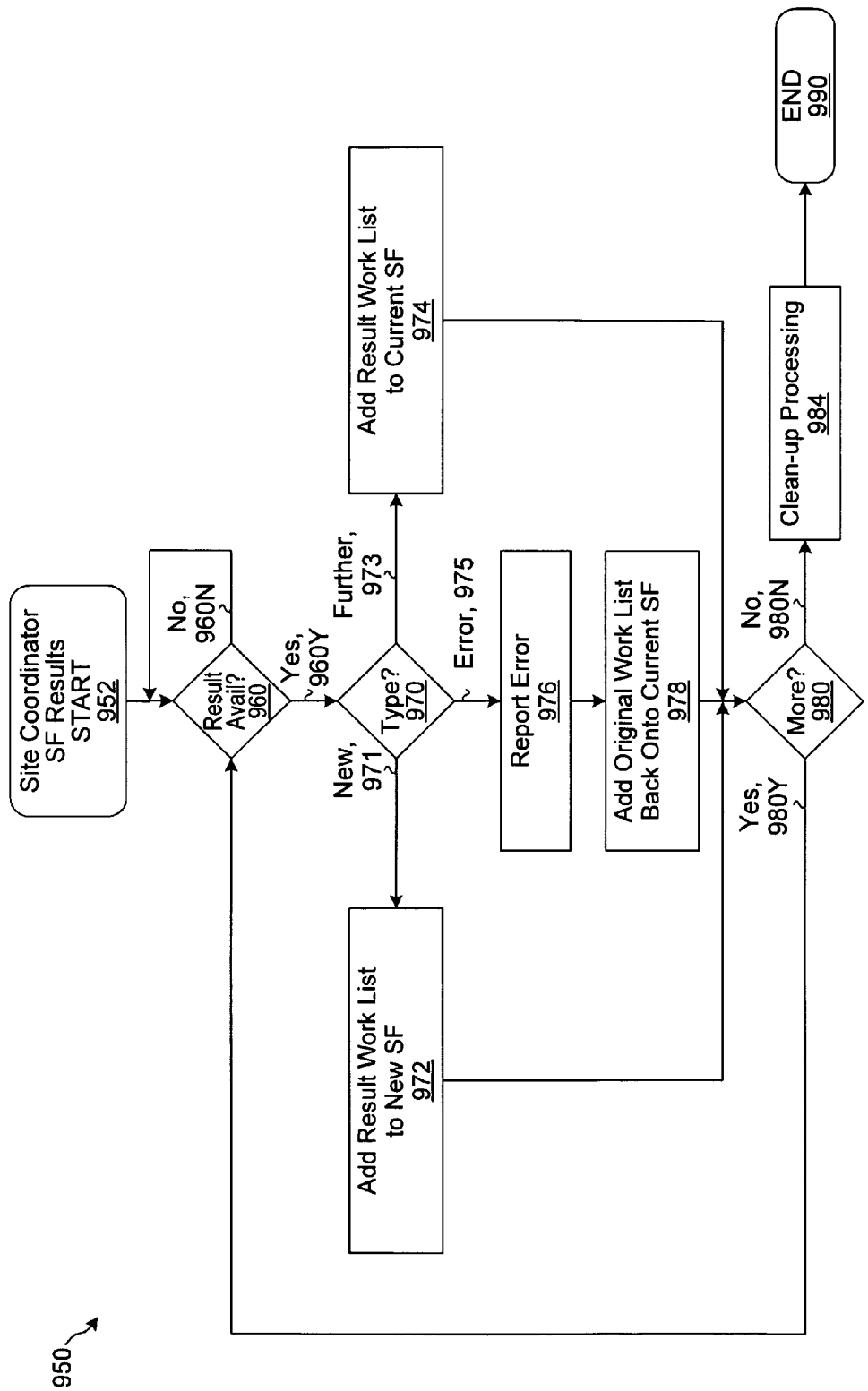
FIG. 9B illustrates selected details of a process used in an illustrative embodiment for receiving results generated by one or more grid workers.

FIG. 9B illustrates selected details of a process used in an embodiment for receiving results generated by one or more grid workers. In some embodiments, process 950 is used on a site coordinator, such as site coordinator 140 of FIG. 2. In various embodiments, operation of process 950 by a site coordinator accumulates results from one or more grid workers, such as grid workers 244.1 to 244.K of FIG. 2. In further embodiments, some, or a portion of some, of the results include new and/or revised (updated) work lists, and the work lists can be added to one or more state files (such as illustrated in FIG. 5 with further current work 566 added to state file 252, and with next time work 560 added to new state file 552). In some embodiments, process 950 performs some or all of a function of an interpret/process/concatenate operation (550) of FIG. 5.

In various embodiments, process 950 starts (952), and determines whether any results are available (960), and if none are available, waits until some results are available (960N). In some embodiments, the results are produced by each of one or more grid workers in response to a respective work list apportioned to each grid worker, such as by process 900 of FIG. 9A.

If results are available (960Y), process 950 determines a type of one of the results (970). According to various embodiments, the type of the result is one or more of: new ("new" 971); further ("further" 973); and error ("error" 975). For example, in some embodiments, a first portion of a result from a grid worker is new work ("new" 971), and a second portion of the result is further work ("further" 973). In some embodiments, a grid worker returns a result of a single type. In other embodiments, a grid worker returns a result having one or more portions, wherein each portion has an associated type, and at least some of the portions are each processed independently (as an independent result) by process 950.

In some embodiments, other types of results, are provided from a grid worker. According to various embodiments, results from a grid worker include one or more of: results of scans of files; lists of flagged files; lists of new directories; modified versions of work lists; and fingerprints or other information of particular files.

For results that are in error ("error" 975), an error is reported (976). In various embodiments, detection of a failure of a particular grid worker is managed similar to the particular grid worker producing a result having an error type. In some embodiments, assignment of a respective work list to a particular grid worker is tracked, such as when the respective work list is assigned to the particular grid worker (932 of FIG. 9A). An error associated with the particular grid worker is enabled to specify the respective work list. In further embodiments, in response to a result having an error type from the particular grid worker, the respective work list is added back onto a state file (978), such as state file 252 of FIG. 5. In some embodiments, the respective work list is added onto a new state file (978), such as new state file 552 of FIG. 5. In various embodiments, the respective work list includes an indication that the respective work list was not performed on a previous attempt. In further embodiments, the indication that the respective work list was not performed includes a counter, the counter indicating a number of times that the respective work list was not performed. According to various embodiments, the respective work list is: appended to the end of the state file; or prepended to the front of the state file; or inserted elsewhere in the state file.

For results and/or portions of results that are new work ("new" 971), the new work is added to a new state file, such as new state file 552 of FIG. 5. The new work is appended to the end of the new state file or alternatively prepended to the front of the new state file.

In contrast to new work that is added to a new state file, for results and/or portions of results that are further work ("further" 973), the further work is added to a (current) state file, such as (current) state file 252 of FIG. 5. The further work is prepended to the front of the state file, or alternatively appended to the end of the state file.

After processing an available result (as new work via 972, as further work via 974, or as an error via 978), process 950 determines (980) whether there are more results to process, such as a subsequent portion of a result from a grid worker, or whether there is more outstanding work enabled to generate results, such as one or more grid workers that have been assigned a respective work list and have not yet returned a result. If there are more results or more outstanding work (980Y), process 950 repeats the earlier determination of whether any results are available (960).

If there are no more results and no more outstanding work (980N), process 950 performs any necessary clean-up (984), such as deallocating data structures or closing communications channels, and terminates (990).

Figure 10:
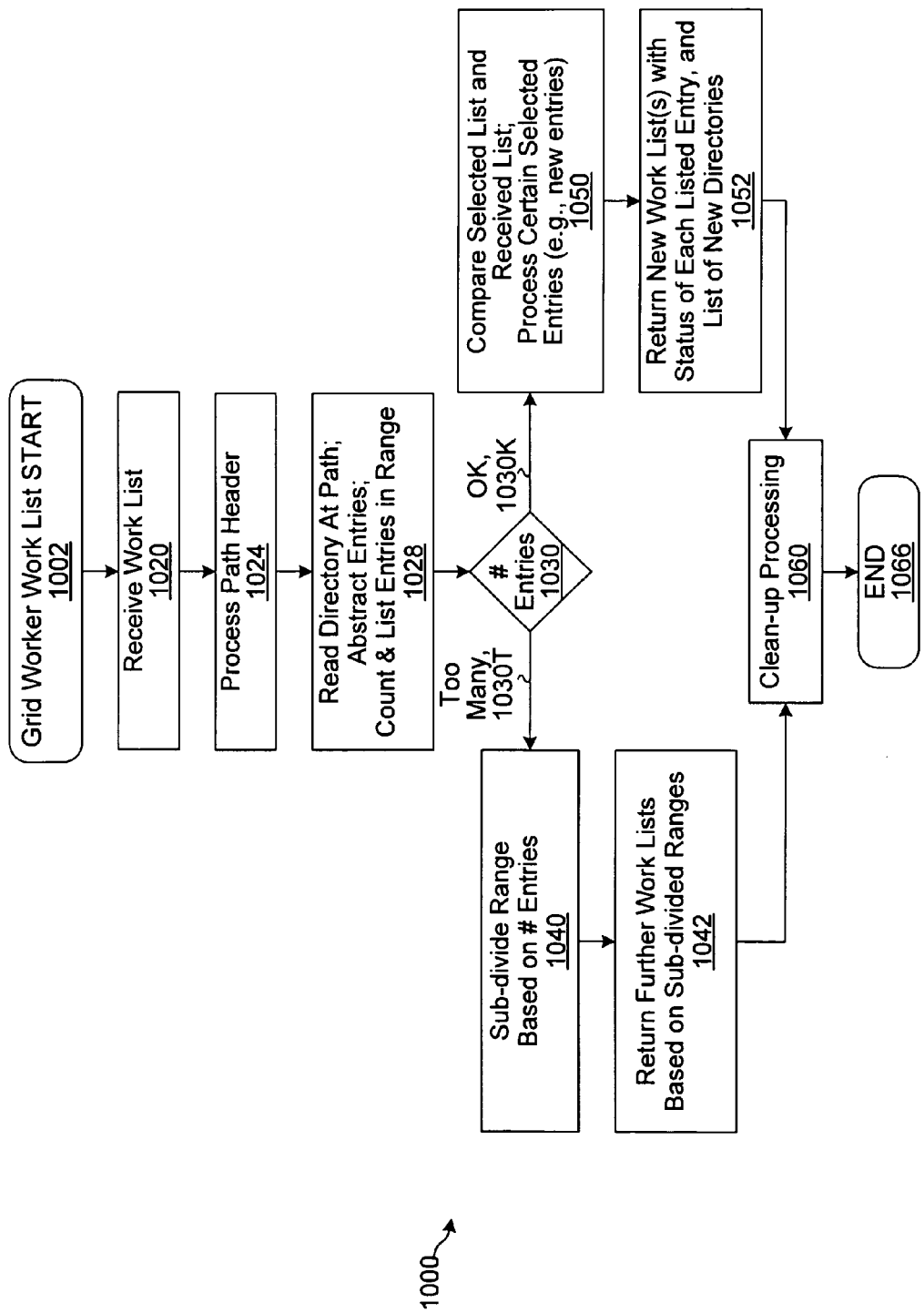
FIG. 10 illustrates selected details of a process used in an illustrative embodiment to perform actions in response to a work list.

FIG. 10 illustrates selected details of a process used in an embodiment to perform actions in response to a work list. In some embodiments, process 1000 is used on a grid worker, such as one of grid workers 244.1 to 244.K of FIG. 2. As in previous examples, a grid worker receives and processes a work list, and produces results for a site coordinator, such as site coordinator 140 of FIG. 2. As previously described, in some embodiments, the site coordinator uses process 950 of FIG. 9B to operate on the results. In some embodiments, process 1000 performs some or all of a function of a process by grid worker operation (644.1) of FIG. 6. In some embodiments, process 1000 is used on an agent, such as one of agents 246.1 to 246.M of FIG. 2. In various embodiments, an agent receives and/or reads (such as from a local disk) a work list, processes the work list, and produces results for a site coordinator, such as site coordinator 140 of FIG. 2. In further embodiments, the agent stores an updated version of the work list on the local disk.

In various embodiments, process 1000 starts (1002), and receives a work list (1020), such as work list 413 of FIG. 4A. The work list is interpreted, such as by parsing, and a path header (such as path header 410 of FIGS. 4A and 4B) is determined from the work list and processed (1024). As in previous examples, the path header includes a path of a directory, such as path 420 of FIG. 4B. As previously described, in some embodiments, the path header further includes a range specification, such as one or more of minimum range specification 422 and maximum range specification 424.

The path of the path header is used to read contents of the directory at the path, and the contents are further processed (1028). In some embodiments, if the directory has been deleted (and is no longer present), process 1000 returns status indicating a deleted directory and terminates. In other embodiments, if the directory has been deleted, the directory contents are treated as empty, and additionally the directory is reported as having been deleted (when process 1000 returns results), but other processing of process 1000 continues.

As previously described in regard to FIG. 7, for some of the entries of the directory, respective abstracts are generated and filtered according to a range specification. In further embodiments, a number of the entries falling within the range specification is determined.

In various embodiments, process 1000 determines whether the number of the entries falling within the range specification is above or below a threshold (1030). In some embodiments and/or usage scenarios, the threshold is 100 entries; in other embodiments and/or usage scenarios, the threshold is 1000 entries. In some embodiments, the threshold is adjusted based on factors such as, but not limited to, processing speed and load average of a computer performing process 1000. If the number of entries is above the threshold (1030T), then in some embodiments, the range specification is sub-divided (1040) into a plurality of sub-range specifications, and further work lists are determined and returned based, at least in part, on the sub-range specifications (1042). A number of approaches have been devised for managing sub-range specifications, depending on implementation-specific constraints. In some embodiments, the range specification is sub-divided such that each sub-range specification has a respective number of entries (of the list of respective abstracts) less than the threshold. In some embodiments, the range specification is sub-divided into N pieces having roughly a same number of entries of the list of respective abstracts, where N is the number of entries divided by the threshold and rounded up to the nearest integer. In some embodiments, the range specification is sub-divided into N pieces of roughly (plus or minus one) a same range, where N is the number of entries divided by the threshold and rounded up to the nearest integer. In some embodiments, the list of the respective abstracts falling within the range specification (i.e., the selected abstracts) is sub-divided into pieces corresponding to the sub-range specifications, and the pieces are returned as individual work lists. In other embodiments, the selected abstracts are returned, such as in a form of a work list, without sub-dividing, and a site coordinator sub-divides the selected abstracts into a plurality of work lists each of a size less than a threshold. In some embodiments, each of the sub-range specifications is returned as an entry in a list of new directories.

If the number of entries is at or below the threshold (1030K), then in some embodiments, the selected abstracts are compared (1050) with a received lists of abstracts specified in the work list (such as via list entries of the work list, as illustrated by received abstracts 724 of FIG. 7). As a result of the comparison, certain selected entries (corresponding to certain ones of the abstracts) are processed (1050), such as by a file scanning operation. For example, in some embodiments, new entries (not represented in the received abstracts) are scanned. In various embodiments, the comparing and/or the processing produces results, such as new work lists and/or the status of some of the entries of the directory, and the results are returned (1052). In some embodiments, results are returned by writing them to a local file, and having a site coordinator subsequently retrieve the results, such as via file upload/download 345 of FIG. 3.

After processing the work list, process 1000 performs any necessary clean-up (1060), such as closing files, deallocating data structures or closing communications channels, and terminates (1066).

Bootstrapping and Agent Communication

Figure 11:
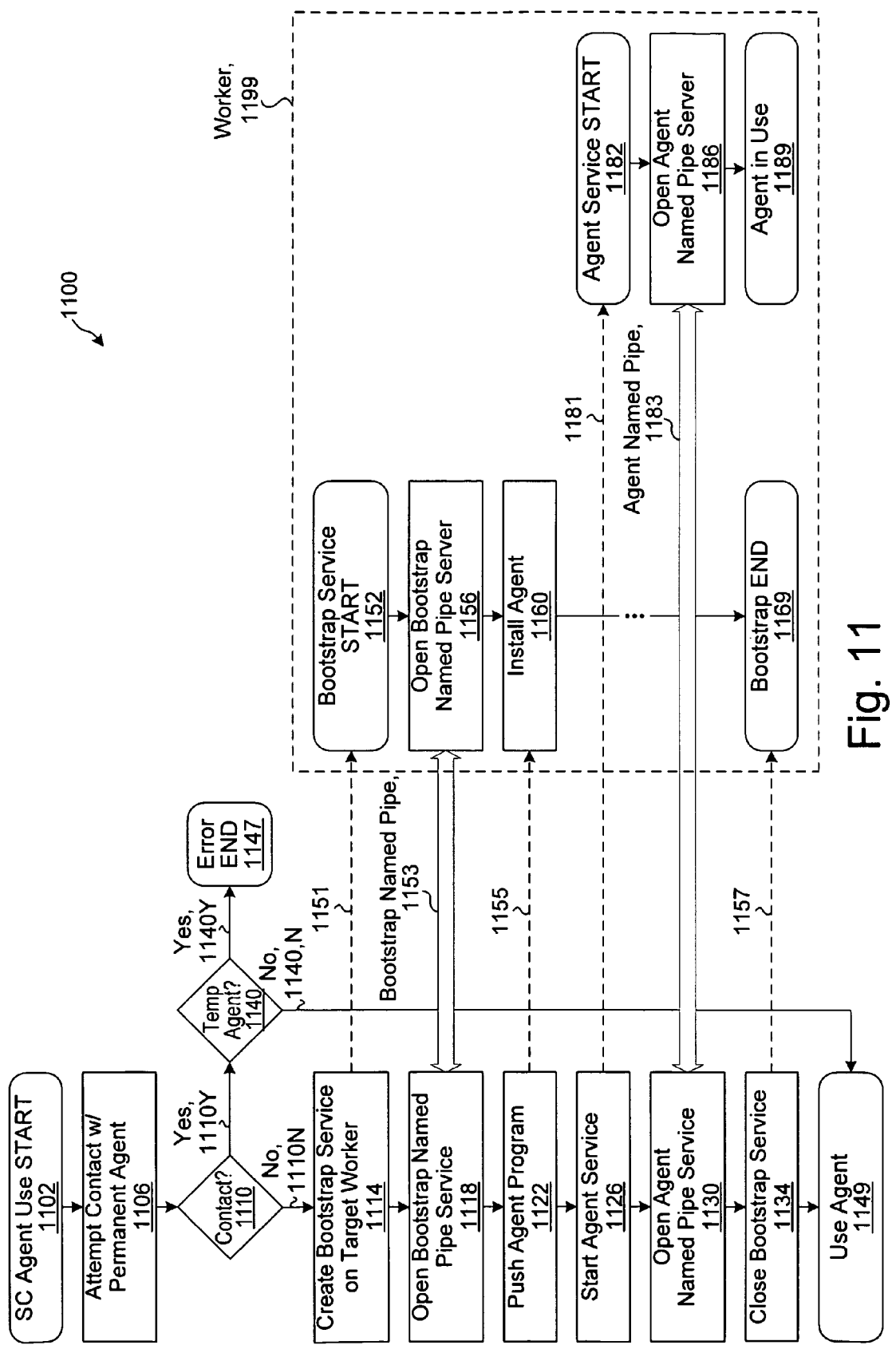
FIG. 11 illustrates selected details of a process used in an illustrative embodiment to establish communication with an agent.

FIG. 11 illustrates selected details of a process used in an embodiment to establish communication with an agent. In some embodiments, a portion (1199) of process 1100 is performed on a worker (such as one of grid workers 244.1 to 244.K of FIG. 2, or one of agents 246.1 to 246.M of FIG. 2), and another portion of process 1100 is performed on a site coordinator (such as site coordinator 140 of FIG. 2). In various embodiments, operation of process 1100 uses communications channels (such as at least some of "Communication via Communications Channels 243" 394 of FIG. 3) between a site coordinator and a grid worker (or an agent) to establish communication with and use of an agent program running on the grid worker (or the agent). In some embodiments, process 1100 is performed as part of sending a work list to a grid worker (or an agent), such as illustrated by "Assign Work List to Grid Worker and Send" 932 of FIG. 9A.

In various embodiments, process 1100 starts (1102), and attempts contact with a permanent agent program running on the worker, such as by attempting communication with the agent (1106) using a communications channel (for example, one of agent task controls 346 or other agent commands 347 of FIG. 3).

A determination is made if communication succeeds (1110), and if so (1110Y), a determination is made as to whether the agent program is a temporary agent or a permanent agent (1140). In various embodiments, the determination is performed via querying the agent program. If the agent program is a permanent agent (1140N), then the agent is usable and process 1100 ends successfully (1149). If the agent program is a temporary agent (1140Y), then, in some embodiments, an error of some type has occurred (such as an attempt to start a second temporary agent on a same worker) and process 1100 ends unsuccessfully (1147).

In the illustrated embodiment of FIG. 11, if a communication attempt with an agent does not succeed (1110N), the site coordinator creates a bootstrap service on the worker (1114), such as via bootstrap communication 341 of FIG. 3. Here, the bootstrap service is created using, at least in part, a Windows®-compatible StartService function. Other bootstrap service creation approaches are also viable. Path 1151 indicates communication with the worker, leading to the worker starting a bootstrap service (1152). In response to the starting, the bootstrap service opens a communications channel (1156), such as a named pipe server, to send and/or to receive communications (as illustrated by bootstrap named pipe 1153). Correspondingly, in response to creating the service, the site coordinator opens the named pipe service (1118) to communicate over the name pipe with the bootstrap service on the worker.

In some embodiments, a presence of a firewall or other network routing limitations (such as due to network address translation) between the site coordinator and the worker prevents certain types of communications from being established and/or sent. According to various embodiments, one or more of the following types of communication are not feasible: sending an arbitrary executable script from the site coordinator to the worker; sending an executable script larger than a system-dependent size to the worker; establishing some or any communications "upstream" (from the worker to the site coordinator). In further embodiments, the size of a command that is sent with a Windows®-compatible StartService function is limited. For example, in various embodiments, the command must be less than 2046 characters long. In view of the foregoing potential challenges, in some embodiments, the bootstrap service is created and started as follows:

A Windows®-compatible StartService function enables execution of a script. The script used to create a bootstrap service takes a form of:
echo<base 64 encoded DLL>|uncompress|base64decode>myDll; rundll myDll Creating the bootstrap service in this fashion advantageously operates through firewalls that prevent large executable "shell" scripts from being sent, and advantageously enables the bootstrap service to be started from a compiled program in the form of a DLL, avoiding size overheads associated with directly-executable compiled programs. Compressing the DLL advantageously enables a much larger DLL to be sent.

Continuing in FIG. 11, the site coordinator uses the named pipe to push an agent program to the worker (1122), as illustrated by path 1155 (and, as illustrated in FIG. 3 as executable agent program 342). The bootstrap service receives and, in various embodiments, installs the agent program (1160). In some embodiments, installing the agent program is performed in response to a general command processing function of the bootstrap service, such as command processing 1260 of FIG. 12. In further embodiments, the site coordinator optionally issues other commands or communicates other files or information to or from the bootstrap service. In various embodiments, the bootstrap service ends when the site coordinator sends a "quit" command, and the bootstrap service terminates (1169).

With the agent program installed on the worker, the site coordinator starts an agent service (1126), as illustrated by path 1181. In some embodiments, the agent service is created using, at least in part, Windows®-compatible CreateService and/or StartService functions, leading to the agent service starting (1182). Similarly to communications with the bootstrap service, in response to the starting, the agent service opens a communications channel (1186), such as a named pipe server, to send and/or to receive communications (as illustrated by agent named pipe 1183). Correspondingly, in response to creating/starting the service, the site coordinator opens the named pipe service (1130) to communicate over the name pipe with the agent service on the worker. At this point, the agent service is in use (1189). In some embodiments, the site coordinator performs clean-up functions, such as closing the bootstrap service (1134). The site coordinator is subsequently able to use the agent (1149).

Figure 12:
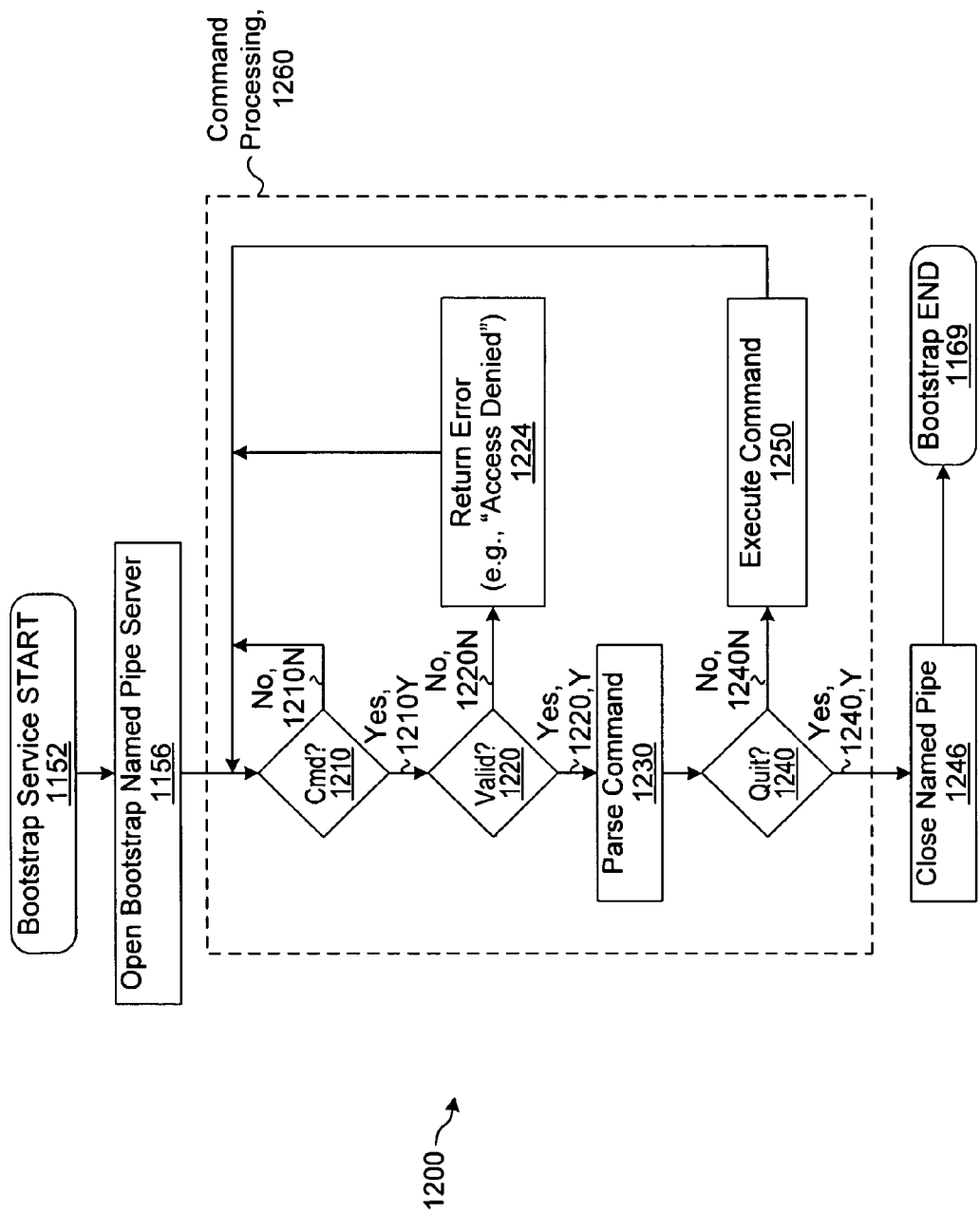
FIG. 12 illustrates selected details of a process used in an illustrative embodiment for a bootstrap service.

FIG. 12 illustrates selected details of a process used in an embodiment for a bootstrap service. Process 1200 of FIG. 12 illustrates in further detail than FIG. 11 command processing details (1260) and other details of an embodiment of the bootstrap service. After the bootstrap service has opened a named pipe server (1156) for communication, such as with a site coordinator, the bootstrap service waits for a command (1210, looping back via 1210N). Upon receipt of a command (1210Y), a determination is made as to whether the command is valid (1220). If the command is invalid (1220N), an error is returned (1224), such as "access denied" and process 1200 returns to await another command (1210).

If the command is valid (1220Y), the command is parsed (1230). A determination is made as to whether the command is a "quit" command (1240). If the command is not a "quit" command (1240N), the command is executed (1250). For example, in some usage scenarios, the command is a command to receive a downloaded file, or to install a downloaded file, such as an agent program. Process 1200 then returns to await another command (1210).

If the command was a "quit" command (1240Y), then process 1200 performs any necessary clean-up, such as closing the named pipe server (1246). The process then terminates (1169).

Example Embodiment Techniques

In some embodiments, various combinations of all or portions of functions performed by an enterprise coordinator (such as enterprise coordinator 110 of FIG. 1), a site coordinator (such as site coordinator 140 of FIG. 2), a grid worker (such as one or more of grid workers 144 of FIG. 1), and portions of a processor, microprocessor, system-on-a-chip, application-specific-integrated-circuit, hardware accelerator, or other circuitry providing all or portions of the aforementioned functions, are specified by descriptions compatible with processing by a computer system. The specification is in accordance with various descriptions, such as hardware description languages, circuit descriptions, netlist descriptions, mask descriptions, or layout descriptions. Example descriptions include: Verilog, VHDL, SPICE, SPICE variants such as PSpice, IBIS, LEF, DEF, GDS-II, OASIS, or other descriptions. In various embodiments the processing includes any combination of interpretation, compilation, simulation, and synthesis to produce, to verify, or to specify logic and/or circuitry suitable for inclusion on one or more integrated circuits. Each integrated circuit, according to various embodiments, is designed and/or manufactured according to a variety of techniques. The techniques include a programmable technique (such as a field or mask programmable gate array integrated circuit), a semi-custom technique (such as a wholly or partially cell-based integrated circuit), and a full-custom technique (such as an integrated circuit that is substantially specialized), any combination thereof, or any other technique compatible with design and/or manufacturing of integrated circuits.

In some embodiments, various combinations of all or portions of functions performed to apportion and/or to build state files (as illustrated in FIG. 5), to process state files (as illustrated in FIG. 6), to accumulate results from workers (as illustrated in FIG. 5), to process work lists (as illustrated in FIG. 7), to generate abstracts (as illustrated in FIG. 8), to communicate among enterprise coordinators, site coordinators, and workers (as illustrated in FIG. 3), and other operations necessary to use, to operate, or to control one or more of enterprise coordinators, site coordinators, grid workers, permanent agents, temporary agents, state files, or work lists are specified, designed, and/or manufactured, at least in part, by one or more of software, firmware, on-chip microcode, and off-chip microcode.

In some embodiments, various combinations of all or portions of functions as described by or associated with, for example, FIGS. 5, 6, 7, 8, 9A, 9B, 10, 11, and 12 are performed by execution and/or interpretation of one or more program instructions, by interpretation and/or compiling of one or more source and/or script language statements, or by execution of binary instructions produced by compiling, translating, and/or interpreting information expressed in programming and/or scripting language statements. The statements are compatible with any standard programming or scripting language (such as C, C++, Fortran, Pascal, Ada, Java. VBscript, and Shell).

The following three patent applications (incorporated by reference for all purposes elsewhere herein) describe various embodiments of executing tasks (such as scanning, analyzing, and/or classifying) on information (such as files and/or documents), including producing file information and/or fingerprints (such as sectional fingerprints and/or keys) by an agent (such as a content appliance):

U.S. Non-Provisional application Ser. No. 10/949,539, filed Sep. 24, 2004, first named inventor James Nisbet, and entitled INFERRING DOCUMENT AND CONTENT SENSITIVITY FROM PUBLIC ACCOUNT ACCESSIBILITY;

U.S. Non-Provisional application Ser. No. 10/949,545, filed Sep. 24, 2004, first named inventor James Nisbet, and entitled INFERRING CONTENT SENSITIVITY FROM PARTIAL CONTENT MATCHING; and U.S. Non-Provisional application Ser. No. 10/949,552, filed Sep. 24, 2004, first named inventor James Nisbet, and entitled PARTIAL DOCUMENT CONTENT MATCHING USING SECTIONAL ANALYSIS.

The following patent application (incorporated by reference for all purposes elsewhere herein) describes various embodiments of operating temporary agents (such as repercussionless ephemeral agents) to execute tasks (such as an analysis of files):

U.S. Non-Provisional application Ser. No. 11/608,240, filed Dec. 7, 2006, first named inventor James Christopher Wiese, and entitled A REPERCUSSIONLESS EPHEMERAL AGENT FOR SCALABLE PARALLEL OPERATION OF DISTRIBUTED COMPUTERS.

CONCLUSION

Certain choices have been made in the description merely for convenience in preparing the text and drawings and unless there is an indication to the contrary the choices should not be construed per se as conveying additional information regarding structure or operation of the embodiments described. Examples of the choices include: the particular organization or assignment of the designations used for the figure numbering and the particular organization or assignment of the element identifiers (i.e., the callouts or numerical designators) used to identify and reference the features and elements of the embodiments.

The words "includes" or "including" are specifically intended to be construed as abstractions describing logical sets of open-ended scope and are not meant to convey physical containment unless explicitly followed by the word "within."

The word "site", including uses in compound words such as "site-specific" and "site-global", is specifically intended to be construed as referring to a logical entity, and does not, by itself, imply any type of physical partitioning or locality. For a first example usage scenario, a site corresponds to a single machine room. For a second example usage scenario, a site corresponds to a single building, having one or more machine rooms. For a third example usage scenario, a site corresponds to several buildings located in various cities, states, or countries.

Although the foregoing embodiments have been described in some detail for purposes of clarity of description and understanding, the invention is not limited to the details provided. There are many embodiments of the invention. The disclosed embodiments are exemplary and not restrictive.

It will be understood that many variations in construction, arrangement, and use are possible consistent with the description, and are within the scope of the claims of the issued patent. For example, interconnect and function-unit bit-widths, clock speeds, and the type of technology used are variable according to various embodiments in each component block. The names given to interconnect and logic are merely exemplary, and should not be construed as limiting the concepts described. The order and arrangement of flowchart and flow diagram process, action, and function elements are variable according to various embodiments. The switches for selective inclusion (such as selective inclusion switches 718 of FIG. 7) are an abstraction for design-time or run-time choices, and are implemented in a variety of ways. Also, unless specifically stated to the contrary, value ranges specified, maximum and minimum values used, or other particular specifications (such as a nature and/or a type of communications between software programs and/or modules; a nature and/or a type of communication between computers and/or resources; a nature and/or a type of a network; a nature and/or a type of network storage; a nature and/or a type of resource; a contents and/or layout of data structures; and the number of entries or stages in registers and buffers), are merely those of the described embodiments, are expected to track improvements and changes in implementation technology, and should not be construed as limitations.

Functionally equivalent techniques known in the art are employable instead of those described to implement various components, sub-systems, functions, operations, routines, and sub-routines. It is also understood that many functional aspects of embodiments are realizable selectively in either hardware (i.e., generally dedicated circuitry) or software (i.e., via some manner of programmed controller or processor), as a function of embodiment dependent design constraints and technology trends of faster processing (facilitating migration of functions previously in hardware into software) and higher integration density (facilitating migration of functions previously in software into hardware). Specific variations in various embodiments include, but are not limited to: differences in partitioning; different form factors and configurations; use of different operating systems and other system software; use of different interface standards, network protocols, or communication links; and other variations to be expected when implementing the concepts described herein in accordance with the unique engineering and business constraints of a particular application.

The embodiments have been described with detail and environmental context well beyond that required for a minimal implementation of many aspects of the embodiments described. Those of ordinary skill in the art will recognize that some embodiments omit disclosed components or features without altering the basic cooperation among the remaining elements. It is thus understood that much of the details disclosed are not required to implement various aspects of the embodiments described. To the extent that the remaining elements are distinguishable from the prior art, components and features that are omitted are not limiting on the concepts described herein.

All such variations in design are insubstantial changes over the teachings conveyed by the described embodiments. It is also understood that the embodiments described herein have broad applicability to other computing and networking applications, and are not limited to the particular application or industry of the described embodiments. The invention is thus to be construed as including all possible modifications and variations encompassed within the scope of the claims of the issued patent.

What is claimed is:

1. A method comprising:
controlling each of a first group of controlled computers of a site to perform respective local scans of respective file subsets, each respective file subset comprising files that are of respective local volumes implemented via respective local disks associated with the respective controlled computer;
controlling a second group of controlled computers of the site to collectively perform a distributed scan of a file subgroup, the file subgroup comprising files that are of global volumes implemented by one or more storage servers of the site;
managing a state file that specifies the file subgroup;
aggregating results of the local scans and the distributed scan;
providing the aggregated results to a scheduling computer; and
wherein the acts of controlling, the act of managing, and the act of aggregating results are via a controlling computer of the site that is enabled to communicate with the first and the second groups of controlled computers via a local area network of the site, and further enabled to communicate with the scheduling computer via a wide area network.

2. The method of claim 1, wherein scanning a plurality of files of a plurality of storage volumes comprises the acts of controlling and the act of managing, and the local and the global volumes comprise the plurality of storage volumes.

3. The method of claim 1, wherein the first group of controlled computers comprises one or more agents.

4. The method of claim 1, wherein the second group of controlled computers comprises one or more grid workers.

5. The method of claim 1, wherein the controlling computer is a site coordinator that is specific to the site.

6. The method of claim 1, wherein at least one of the storage servers comprises a storage attached network or network attached storage.

7. The method of claim 1, wherein the scheduling computer is an enterprise coordinator.

8. A system comprising:
a processing element enabled, via a local area network, to communicate with a first group of controlled computers of a site, each of the first group of controlled computers having respective local disks providing respective local volumes, the processing element being further enabled, via the local area network, to communicate with a second group of controlled computers of the site, each of the second group of controlled computers having access to one or more global volumes provided by one or more storage servers of the site, the processing element being further enabled, via a wide area network, to communicate with a scheduling computer; and
a storage medium coupled to the processing element, the storage medium enabled to store instructions that when executed by the processing element cause the processing element to perform functions comprising
controlling each of the first group of controlled computers to perform respective local scans of respective file subsets, each respective file subset comprising files of the respective local volumes of the respective controlled computer,
controlling the second group of controlled computers to collectively perform a distributed scan of a file subgroup, the file subgroup comprising files of the global volumes,
managing a state file that specifies the file subgroup,
aggregating results of the local scans and the distributed scan, and
providing the aggregated results to the scheduling computer.

9. The system of claim 8, wherein a site coordinator that is specific to the site comprises the processing element.

10. The system of claim 8, wherein the functions further comprise providing a respective directory path to each of the second group of controlled computers.

11. The system of claim 8, wherein the functions further comprise receiving a list of directories from at least one of the second group of controlled computers, and based at least in part on the list, providing a directory path to one or more of the second group of controlled computers.

12. The system of claim 8, wherein at least one of the first group of controlled computers is a temporary agent.

13. The system of claim 8, wherein at least one of the first group of controlled computers is a permanent agent.

14. A non-transitory computer readable medium having a set of instructions stored therein which when executed by a processing element of a controlling computer of a site causes the processing element to perform functions comprising:
controlling, via a local area network of the site, each of a first group of controlled computers of the site to perform respective local scans of respective file subsets, each respective file subset comprising files that are of respective local volumes implemented via respective local disks associated with the respective controlled computer;
controlling, via the local area network, a second group of controlled computers of the site to collectively perform a distributed scan of a file subgroup, the file subgroup comprising files that are of global volumes implemented by one or more storage servers of the site; managing a state file that specifies the file subgroup;
aggregating results of the local scans and the distributed scan, the results comprising identification of the files of the local and the global volumes that are new, modified, or deleted; and
providing, via a wide area network, the aggregated results to a scheduling computer.

15. The non-transitory computer readable medium of claim 14, wherein the first group of controlled computers comprises one or more agents, at least one of the agents is a temporary agent and at least one of the agents is a permanent agent, the second group of controlled computers comprises one or more grid workers, the controlling computer is all or any portion of a site coordinator that is specific to the site, at least one of the storage servers is either a storage attached network or comprises network attached storage, and the scheduling computer is all or any portion of an enterprise coordinator.

16. The non-transitory computer readable medium of claim 14, wherein the functions further comprise providing a directory path to at least one of the second group of controlled computers.

17. The non-transitory computer readable medium of claim 14, wherein the functions further comprise receiving respective lists of directories from each of a first subgroup of the second group of controlled computers, and based at least in part on the lists, providing a respective directory path to each of a second subgroup of the second group of controlled computers.

18. The non-transitory computer readable medium of claim 14, wherein the functions further comprise managing a bootstrap communication with one of the first group of controlled computers.

19. The non-transitory computer readable medium of claim 14, wherein the functions further comprise communicating a same directory path to two or more of the second group of controlled computers, the same directory path to be analyzed at least partially in parallel by the two or more of the second group of controlled computers as part of the distributed scan, and further communicating unique respective ranges to each of the two or more of the second group of controlled computers, the unique respective ranges being with respect to the same directory path.

20. The non-transitory computer readable medium of claim 14, wherein the functions further comprise providing one or more hashes of one or more corresponding directories to one or more of the second group of controlled computers.

* * * * *